(12) United States Patent
Kelly et al.

(10) Patent No.: US 10,501,076 B2
(45) Date of Patent: Dec. 10, 2019

(54) SPEED CONTROL SYSTEM AND METHOD OF OPERATING THE SAME

(71) Applicant: Jaguar Land Rover Limited, Whitley Coventry Warwickshire (GB)

(72) Inventors: James Kelly, Solihull (GB); Andrew Fairgrieve, Rugby (GB); Daniel Woolliscroft, Birmingham (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 590 days.

(21) Appl. No.: 14/421,862

(22) PCT Filed: Aug. 16, 2013

(86) PCT No.: PCT/EP2013/067198
§ 371 (c)(1),
(2) Date: Feb. 16, 2015

(87) PCT Pub. No.: WO2014/027109
PCT Pub. Date: Feb. 20, 2014

(65) Prior Publication Data
US 2015/0217766 A1    Aug. 6, 2015

(30) Foreign Application Priority Data
Aug. 16, 2012  (GB) .................................. 1214651.0

(51) Int. Cl.
*B60W 30/14* (2006.01)
*B60W 50/08* (2012.01)
(Continued)

(52) U.S. Cl.
CPC ........... *B60W 30/143* (2013.01); *B60T 8/175* (2013.01); *B60W 10/11* (2013.01);
(Continued)

(58) Field of Classification Search
None
See application file for complete search history.

(56) References Cited

U.S. PATENT DOCUMENTS

2005/0222717 A1   10/2005  Erban et al.
2007/0222289 A1*   9/2007  Fukuda ................. B60T 8/1766
                                                                303/192
(Continued)

FOREIGN PATENT DOCUMENTS

EP       1342607 A2    9/2003
JP    2002036907 A    2/2002
(Continued)

OTHER PUBLICATIONS

International Search Report for application No. PCT/EP2013/067198, dated Oct. 24, 2013, 3 pages.
(Continued)

*Primary Examiner* — Hussein Elchanti
*Assistant Examiner* — Paul A Castro
(74) *Attorney, Agent, or Firm* — Reising Ethington P.C.

(57) ABSTRACT

A method for operating an off-road speed control system of a vehicle is provided. The method comprises identifying a pattern or change in at least one component of vehicle drag. The method further comprises monitoring vehicle speed to predict where a change in the at least one component of vehicle drag may result in a speed overshoot event or a speed undershoot event. The method still further comprises, in response to the predicted speed overshoot event or speed undershoot event, automatically commanding the application of an appropriate opposing torque to one or more wheels of the vehicle to counteract the predicted speed overshoot or undershoot. An off-road speed control system for a vehicle comprising an electronic control unit (ECU) configured to perform the above-described methodology is also provided.

21 Claims, 4 Drawing Sheets

(51) Int. Cl.
  *B60T 8/175*    (2006.01)
  *F16H 61/02*    (2006.01)
  *B60W 10/11*    (2012.01)
  *B60W 10/184*   (2012.01)
  *B60W 30/18*    (2012.01)
  *F16H 59/66*    (2006.01)

(52) U.S. Cl.
  CPC .... *B60W 10/184* (2013.01); *B60W 30/18109* (2013.01); *B60W 50/08* (2013.01); *F16H 61/0213* (2013.01); *B60T 2201/04* (2013.01); *B60T 2210/14* (2013.01); *B60T 2210/16* (2013.01); *B60T 2220/04* (2013.01); *B60T 2260/06* (2013.01); *B60W 2520/10* (2013.01); *B60W 2530/16* (2013.01); *B60W 2550/141* (2013.01); *B60W 2710/1005* (2013.01); *B60W 2710/182* (2013.01); *B60W 2720/30* (2013.01); *B60Y 2200/20* (2013.01); *F16H 59/66* (2013.01); *F16H 2061/0234* (2013.01)

(56) References Cited

U.S. PATENT DOCUMENTS

2009/0107747 A1\* 4/2009 Luehrsen ................ B60T 8/175
                                                              180/197
2010/0138086 A1\* 6/2010 Imamura ................ B60K 6/445
                                                               701/22

FOREIGN PATENT DOCUMENTS

WO      2011063823 A1     6/2011
WO   WO 2011063823 A1 \*  6/2011   ............ B60W 10/06

OTHER PUBLICATIONS

UK Combined Search and Examination Report for corresponding application No. GB1314723.6, dated Mar. 25, 2014, 5 pages.
Written Opinion for application No. PCT/EP2013/067198, dated Oct. 24, 2013, 5 pages.

\* cited by examiner

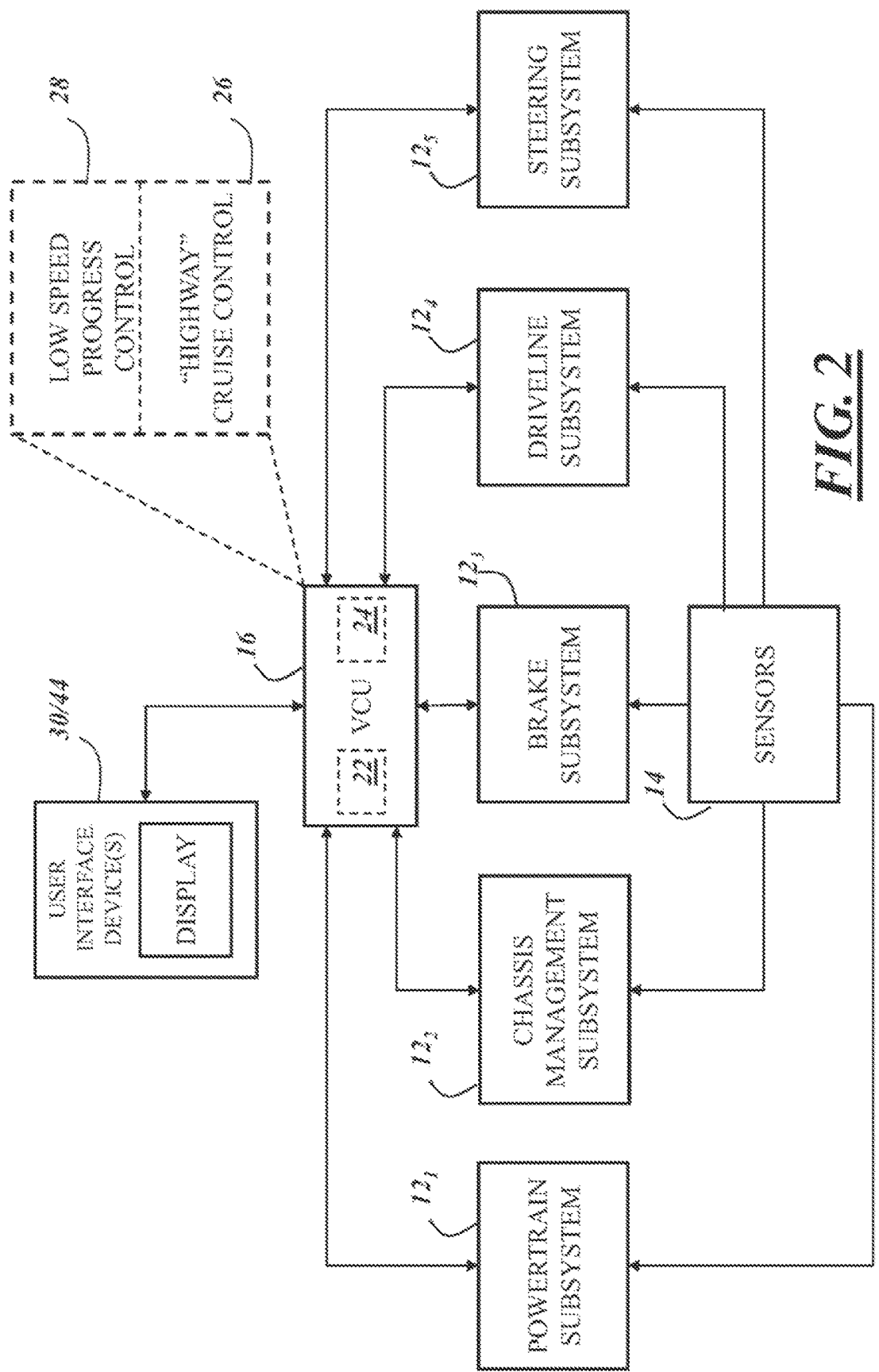

SPEED CONTROL SYSTEM AND METHOD OF OPERATING THE SAME

TECHNICAL FIELD

The present invention relates generally to vehicle speed control, and more particularly, to a speed control system suitable for use off-road and a method of operating the same that may be utilized in a vehicle that is capable of traversing a variety of different terrains.

BACKGROUND

In known vehicle speed control systems, typically referred to as cruise control systems, a set-speed for the vehicle may be initially set by a user (e.g., driver). Once set by the user, the vehicle speed is maintained, on-rod without further intervention by the user so as to improve the driving experience for the user by reducing workload. So long as the speed control system remains in an active state, the speed control system attempts to maintain the speed of the vehicle at the designated set-speed as the vehicle progresses.

Use of a speed control system at low speeds when driving off-road may offer a user considerable advantage in reduced user workload and enhanced vehicle composure. However, if a user attempts to use a speed control system off-road, a powertrain controller, in an attempt to provide a sufficient amount of torque to overcome a high drag obstacle, may cause the amount of torque delivered to one or more wheels to overshoot an amount required to maintain the prevailing set speed and maintain vehicle composure when the level of drag reduces. This may cause an occupant of the vehicle to experience a variation in speed which may give rise to the vehicle body being perceived by the occupant as lurching.

In addition, known cruise control systems are intended primarily for off-road use, and so are arranged cancel in the event that a wheel slip event is detected requiring intervention by a traction control system (TCS) or stability control system (SCS). Accordingly, they are not well suited to maintaining vehicle progress when driving in off-road conditions or on slippery roads, where such events may be relatively common.

Accordingly, there is a need for a speed control system and method for use with the same that minimizes and/or eliminates one or mom of the above-identified deficiencies.

SUMMARY

According to one aspect of the invention for which protection is sought, there is provided a method of operating a speed control system of a vehicle. The method comprises: identifying a pattern or change in at least one component of vehicle drag; monitoring vehicle speed to predict where a change in the at least one component of vehicle drag may result in a speed overshoot event or a speed undershoot event; and, in response to the predicted speed overshoot event or speed undershoot event, automatically commanding the application of an appropriate opposing torque to one or more wheels of the vehicle to counteract the predicted speed overshoot or undershoot. The speed control system may be an off road speed control system According to another aspect of the invention for which protection is sought, there is a provided a speed control system for a vehicle. The system comprises an electronic control unit (ECU) that is configured to: identify a pattern or change in at least one component of vehicle drag; monitor vehicle speed to predict where a change in the at least one component of vehicle drag may result in a speed overshoot event or a speed undershoot event; and, in response to the predicted speed overshoot event or speed undershoot event, automatically command the application of an appropriate opposing torque to one or more wheels of the vehicle to counteract the predicted speed overshoot or undershoot. The speed control system may be an off road speed control system According to another aspect of the invention for which protection is sought, there is provided a vehicle comprising the speed control system described herein.

According to a further aspect of the invention for which protection is sought, there is provided a carrier medium carrying a computer-readable code for controlling a vehicle to carry out the method of the invention as described herein.

Some optional features of the various aspects of the invention are presented in the dependent claims appended hereto.

Use of a speed control system at low speeds when driving off-road may offer a user a considerable advantage in reduced user workload and enhanced vehicle composure. However, if a user attempts to use a speed control system off-road, a powertrain controller, in an attempt to provide a sufficient amount of torque to overcome a high drag obstacle, may cause the amount of torque delivered to one or more wheels to overshoot an amount required to maintain the prevailing set speed and maintain vehicle composure when the level of drag reduces. This may cause an occupant of the vehicle to experience a variation in speed which may give rise to the vehicle body being perceived by the occupant as lurching. An example of this is where a vehicle is being driven through soft sand towards an asphalt or concrete mad. Whilst driving through the sand, a relatively large amount of torque is needed to overcome the drag of the sand on the vehicle and to maintain the desired set-speed.

When the vehicle tyres contact the road, the amount of drag reduces greatly. However, the powertrain may be unable to effect a reduction in the amount of torque applied to one or more wheels sufficiently quickly to compensate for the change in terrain. This is due to the rotational momentum of the engine. The result is that is the tyres grip the road, the powertrain is momentarily producing more torque than is required to negotiate the new surface, causing the vehicle to momentarily exceed the target speed, adversely affecting passenger comfort. This effect can be difficult to control if the terrain is constantly changing. Powertrain response lag may become particularly apparent to a user in such circumstances.

In some embodiments an off-road speed control system according to the present invention may be provided with information in respect of at least one selected from amongst terrain over which the vehicle is driving, vehicle attitude, wheel articulation, wheel speed, gear selection, tyre friction, rolling resistance and selected terrain response (TR) mode, in vehicles not having one or more terrain response modes such information is not provided.

In some embodiments, an off-road speed control system is arranged to look for patterns or variations in vehicle drag such as those that may be caused by driving through soft sand or deep water, and to monitor vehicle speed to predict where a reduction in one or more parameters such as drag and/or rolling resistance may result in a perceivable speed overshoot. The overshoot may be due to a temporary over supply of torque from the powertrain. The system may be operable to compensate for that over-supply by applying automatically an appropriate restraining (i.e., opposing) torque.

The restraining torque may be provided by application of a braking system to one or more wheels, for example by means of an electric machine (which may for example be part of a regenerative braking system in some embodiments), by changing a powertrain gear ratio, for example by changing a selected gear of a transmission, or by any other suitable means.

It is to be understood that by compensating for the momentary torque overshoot by application of an appropriate opposing torque, vehicle composure may be maintained and speed overshoot can be avoided or at least an amount of overshoot reduced. It is to be understood that in compensating for the momentary variation in torque required to traverse a terrain with varied friction (thus giving rise to variations in wheel drag) the off-road speed control system may apply an appropriate opposing torque (positive or negative). Thus vehicle composure may be maintained and speed overshoot or undershoot may be avoided.

In some embodiments an off-road speed control system may be configured to take into account drag on the vehicle at one or more wheels that are experiencing relatively high drag when the system determines how much opposing torque to apply to the powertrain in order to reduce a risk that an occupant of the vehicle experiences a variation in speed which may give rise to the vehicle body being perceived by the occupant as lurching. It is to be understood that the net amount of opposing torque required may correspond to the amount of excess torque due to the powertrain less the amount of opposing torque en the powertrain due to drag or other retarding force acting on the vehicle, for example rolling resistance of one or more wheels or other drag acting on the vehicle, for example due to wading through water. In some embodiments an effect of gravity on the vehicle clue to a gradient may be taken into account.

In the case of a vehicle negotiating sandy terrain, if one or more leading wheels of the vehicle encounter a relatively low drag surface (such as a metalled road), the amount of torque that is required to be applied to the one or more leading wheels in order to reduce excessive acceleration may correspond substantially to the amount of excess torque developed by the powertrain less the amount of opposing torque on the powertrain due to drag of the following wheels in the sandy terrain.

It is to be understood that one or more leading wheels may be considered to act as pathfinders for one or more following wheels. Some embodiments of the invention allow enhanced comfort management when a vehicle is travelling in a forward direction, in particular because in some embodiments one or mere rear wheels may carry less weight than one or more front wheels and occupants of a vehicle may be more sensitive to rear wheel activity than front wheel activity.

In some embodiments, a speed control system is provided that is arranged to permit a user to operate the vehicle at low speeds off-road with the off-road speed control regulating the vehicle speed up to the user selected set-speed.

As noted above, in some embodiments an off-road speed control system may be arranged to look for patterns or variations in vehicle drag as may be caused for example by driving through soft sand or deep water. The system may employ data in respect of such patterns or variations in combination with a knowledge of vehicle speed to predict where a reduction in drag is likely to result in a perceivable speed overshoot. Thus it is to be understood that in some embodiments, an off-road speed control system predicts where a momentary oversupply of torque is likely to occur and compensates for that oversupply by applying an appropriate restraining torque to the powertrain, optionally via the brakes. By compensating for the momentary torque overshoot by application of an appropriate opposing torque, vehicle composure may be maintained and speed overshoot can be avoided.

In some embodiments the speed control system may form part of an All-Terrain Progress Control (ATPC) system or of a Low Speed Progress Control (LSPC), which may be arranged to work independently or in conjunction with vehicle control systems arranged to optimise vehicle configurations for a given terrain over which the vehicle is travelling. An example of such a system is Terrain Response (RTM).

In some embodiments an off-road speed control according to an embodiment of the present invention may be arranged to determine when to apply a retarding torque in dependence on factors such as selected TR mode, road roughness, brake temperature, gradient and a determination whether a user has intervened manually in respect of progress control, for example by depressing an accelerator pedal, changing off-road speed control set speed or changing TR mode. Other arrangements are also useful.

In some embodiments, if a user has requested an increase in vehicle speed by the off-road speed control system, the system may be arranged to temporarily hold vehicle speed or suspend vehicle acceleration in the event a torque overshoot is predicted, and only to resume vehicle acceleration towards an increased set-speed once the system is confident that it can compensate for unwanted acceleration. In this way, the vehicle may accept an increase in set-speed when the off-road speed control system is active, but only attempt to achieve the set-speed where the terrain over which the vehicle is moving will permit vehicle acceleration within a defined corridor (i.e. within a prescribed range, optionally between around +/−(0.1 g-0.2 g), and not be caused to overshoot due to a detected change in drag.

It is to be understood that in some embodiments, a reliability of a prediction of drag variation may further be enhanced by monitoring, by the speed control system, of a path that respective leading and following wheels or tyres are taking when a change in drag is detected at a leading wheel. In this way, the controller may make an assumption that if a following tyre is following the path of a leading tyre, the reduction in drag experienced by the leading tyre will be seen by the following tyre at a time proportional to vehicle speed and wheelbase. This method may be employed to shift unwanted torque (that would otherwise cause an occupant to experience vehicle acceleration that may be perceived as vehicle lurch) to the tyre in the high drag area during the predicted window of torque overshoot, improving fuel economy and reducing brake wear. Shifting of unwanted torque may be accomplished by means of one or more clutches and/or by means of a differential arrangement (which may include one or more clutches), for example a front, centre and/or rear differential arrangement. Other arrangements are also useful.

In some embodiments an off-road speed control system according to the present invention may be operable to control or otherwise influence gear and 'high/low' ratio selection, to ensure that the vehicle is travelling at low speeds off-road in a selected transmission gear and a selected high/low ratio that is appropriate to avoid engine stalling and maintain suitable progress.

In some embodiments, the off-road speed control system may be operable to work with a hill descent control (HDC)/Hill Hold Assist (HHA) system, so as to optimise vehicle composure even when negotiating obstacles on sleep gradients. In some embodiments the vehicle may be configured such that HDC/Hill Hold Assist braking commands override or otherwise take priority over off-road speed control commands. In some embodiments such priority may be arranged to occur if the gradient on which the vehicle is travelling is greater than a pre-determined value and/or the speed is below a pro-determined threshold. Thus in some embodiments a powertrain and/or braking system may respond to HDC or HHA commands in preference to off-road speed control system commands.

In some embodiments the rate of acceleration that is to be employed to accelerate the vehicle from a current set-speed to a changed set-speed may be selected by the off-road speed control system by reference to one or mere pre-determined performance characteristics, optionally characteristics dictated by a Terrain Response system in dependence on Terrain Mode. The characteristics may be prioritised as appropriate in dependence on a change or predicted change in terrain mode. In this way, an off-road speed control system may be arranged to work alone or in cooperation with a Terrain Response system, but not interfere with factors which may otherwise cause erroneous determination of the terrain type.

DESCRIPTION OF THE DRAWINGS

One or more embodiments of the invention will now be described, by way of example only, with reference to the following figures in which:

FIG. 2 is another block diagram of the vehicle illustrated in FIG. 1;

DETAILED DESCRIPTION

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function blocks is made for ease of explanation of the manner of operation of a control system according to an embodiment of the present invention.

Figure 1:
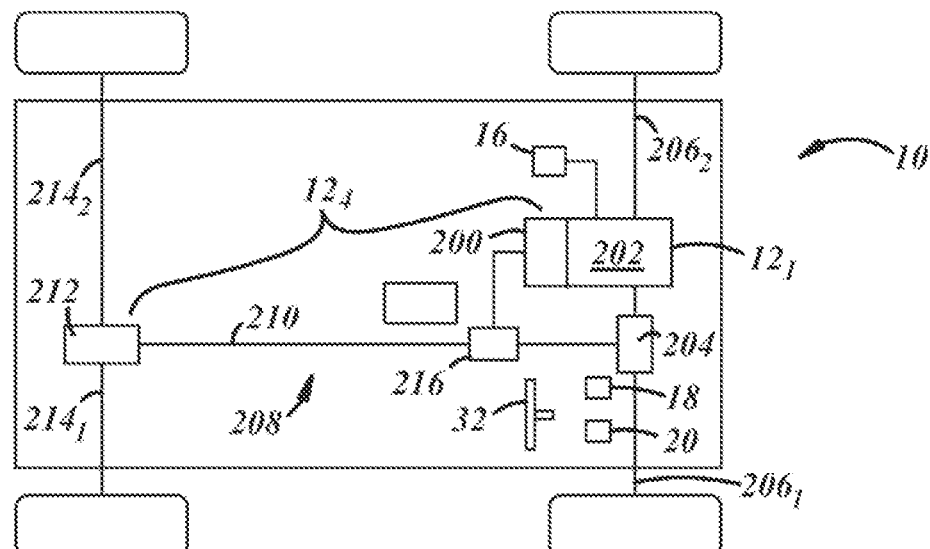
FIG. 1 is a schematic and block diagram of a vehicle.

With reference to FIGS. 1 and 2, there are shown some of the components of a vehicle 10, with which the present method and system may be used. Although the following description is provided in the context of the particular vehicle 10 illustrated in FIGS. 1 and 2, it will be appreciated that this vehicle is merely an example and that other vehicles may certainly be used instead. For instance, in various embodiments, the method and system described herein may be used with any type of vehicle having an automatic, manual, or continuously variable transmission, including traditional vehicles, hybrid electric vehicles (HEVs), extended-range electric vehicles (EREVs), battery electrical vehicles (BEVs), passenger cars, sports utility vehicles (SUVs), cross-over vehicles, and trucks, to cite a few possibilities. According to one embodiment, vehicle 10 generally includes a plurality of subsystems 12, a plurality of vehicle sensors 14, and a vehicle control unit 16 (VCU 16), among any number of other components, systems, and/or devices not illustrated or otherwise described herein.

Subsystems 12 of vehicle to may be configured to perform or control various functions and operations relating to the vehicle and, as illustrated in FIG. 2, may include any number of subsystems, such as, for example, a powertrain subsystem $12_1$, a chassis control or management subsystem $12_2$, a brake subsystem $12_3$, a driveline subsystem $12_4$, and a steering subsystem $12_5$, to cite only a few possibilities.

As is well known in the art, powertrain subsystem $12_1$ is configured to generate power or Torque that is used to propel the vehicle. The amount of torque generated by the powertrain subsystem may also be adjusted so as to control the speed of the vehicle (e.g., to increase the speed of vehicle 10, the torque output is increased). The amount of torque that a powertrain subsystem is capable of outputting is dependent upon the particular type or design of the subsystem, as different powertrain subsystems have different maximum output torque capacities. In one embodiment, however, the maximum output capacity of powertrain subsystem 12, of vehicle 10 may be in the order of 600 Nm. As is known in the art, powertrain output torque may be measured using one or more of vehicle sensors 14 described below (e.g., an engine torque sensor, a driveline torque sensor, etc.) or other suitable sensing means and may be used for a variety of purposes by one or mere components, modules, or subsystems of vehicle 10, in addition to powertrain subsystem $12_1$, including, for example and without limitation, one or more of those described below. Those having ordinary skill in the art will appreciate that powertrain subsystem $12_1$ may be provided according to any number of different embodiments, may be connected in any number of different configurations, and may include any number of different components, like output torque sensors, control units, and/or any other suitable components known in the art. For example, in an embodiment, powertrain subsystem $12_1$ may further include one or more electric machines, for example, one or more electric machines operable as electrical generators, that are configured to apply retarding torque to a portion of the powertrain subsystem and/or one or more wheels of the vehicle so as to cause the vehicle to decelerate with or without the use of the brake subsystem (e.g., frictional braking). Accordingly, the present invention is not limited to any one particular powertrain subsystem.

Chassis management subsystem $12_2$ may be configured to perform, or may be configured to contribute to the performance of, a number of important functions, including those relating to, for example, traction control (TC), stability control systems (SCS) such as dynamic stability control (DSC), hill descent control (HDC), and steering control, to name only a few. To that end, and as is well known in the art, chassis management subsystem $12_2$ is further configured to monitor and/or control a variety of aspects or operational parameters of the vehicle using, for example, readings, signals, or information it receives from one or mere of sensors 14 and/or other vehicle subsystems 12 described or identified herein. For example, subsystem $12_2$ may be configured to receive readings or other information relating to the pressure of the tyres of the vehicle from, for example, tyre pressure sensors associated with each tyre. As such, chassis management subsystem $12_2$ may monitor the tyre pressure and, if necessary, and if the vehicle is so configured, to automatically make, or cause to be made, adjustments to the pressure using an air compressor onboard the vehicle. Similarly, chassis management subsystem $12_2$ may also be configured to receive readings or other information relating to the ride height of the vehicle from, for example, one or more air suspension sensors that may be distributed about the vehicle. In such an instance, chassis management subsystem $12_2$ may monitor the ride height of the vehicle and, if necessary, and if the vehicle is so configured, to automatically make, or cause to be made, adjustments to the ride height using an air compressor (suspension compressor) onboard the vehicle. Chassis management subsystem $12_2$ may further fee configured to monitor the altitude of the vehicle. More particularly, subsystem $12_2$ may receive readings or information from one or more of sensors 14 and/or subsystems 12 described or identified herein (e.g., gyro sensors, vehicle acceleration sensors, etc.) to evaluate the pitch, roll, yaw, lateral acceleration, vibration (e.g., amplitude and frequency) of the vehicle (and/or the vehicle body, in particular), and therefore, the overall altitude of the vehicle. In each instance, the information received or determined by chassis management subsystem $12_2$ may be utilized solely thereby, as described above, or may alternatively be shared with other subsystems 12 or components (e.g., VCU 16) of vehicle 10 which may use the information for any number of purposes. While only a few examples of operational parameters and/or aspects of the vehicle that chassis management subsystem $12_2$ may monitor and/or control have been provided, it will be appreciated that subsystem $12_2$ may be configured to control and/or monitor any number of other or additional parameters/aspects of vehicle 10 in the same or similar manner as that described above. As such, the present invention is not limited to the control and/or monitoring of any particular parameters/aspects. Moreover, it will be further appreciated that chassis management subsystem $12_2$ may be provided according to any number of different embodiments and may include any number of different components, like sensors, control units, and/or any other suitable components known in the art. Accordingly, the present invention is not limited to any one particular chassis management subsystem.

As illustrated in FIG. 1, driveline subsystem $12_4$ may include a multi-ratio transmission or gearbox 200 that is mechanically coupled with an output shaft of a propulsion mechanism of powertrain subsystem $12_1$ (e.g., an engine or electric motor of powertrain subsystem $12_1$, which is identified as reference number 202 in FIG. 1). Transmission 200 is arranged to drive the front wheels of vehicle 10 by means of a front differential 204 and a pair of front drive shafts $206_1$, $208_2$. In the illustrated embodiment, driveline subsystem $12_4$ also comprises an auxiliary driveline portion 208 arranged to drive the rear wheels of vehicle 10 by means of an auxiliary drive-shaft or prop-shaft 210, a rear differential 212, and a pair of rear drive shafts $214_1$, $214_2$. In various embodiments, driveline subsystem $12_4$ may be arranged to drive only the front wheels or the rear wheels, or selectable two wheel drive/four wheel drive vehicles. In an embodiment such as that illustrated in FIG. 1, transmission 200 is releasably connectable to the auxiliary driveline portion 208 by means of a transfer case or power transfer unit 216, allowing selectable two wheel drive or four wheel drive operation, in certain instances, and as is well known in the art, transfer unit 216 may be configured to operate in either a high range (HI) or levy range (LO) gear ratio, which may be adjustable by driveline subsystem $12_4$ itself and/or by another component of vehicle 10, such as, for example, VCU 16. Those having ordinary skill in the art will appreciate that driveline subsystem $12_4$ may be provided according to any number of different embodiments, may be connected in any number of different configurations, and may include any number of different components, like sensors (e.g., HI/LO ratio sensor, transmission gear ratio sensors, etc.), control units, and/or any other suitable components known in the art. Accordingly, the present invention is not limited to any one particular driveline subsystem.

In addition to those subsystems described above, vehicle 10 may further comprise any number of other or additional subsystems, such as, for example, a brake subsystem $12_3$ and a steering subsystem $12_5$. For the purposes of this invention, each of the aforementioned, subsystems 12, and the functionality corresponding thereto, is conventional in the art. For example, brake subsystem $12_3$ applied brake force to one or more vehicle wheels. As such, detailed descriptions will not be provided; rather, the structure and function of each identified subsystem 12 will be readily apparent to those having ordinary skill in the art.

In one embodiment, one or more of subsystems 12 may be under at least a certain degree of control by VCU 16. In such an embodiment, those subsystems 12 are electrically coupled to, and configured for communication with, VCU 16 to provide feedback to VCU 16 relating to operational or operating parameters of the vehicle, as well as to receive instructions or commands from VCU 16. Taking powertrain subsystem $12_1$ as an example, powertrain subsystem $12_1$ may be configured to gather various types of information relating to certain operating parameters thereof, such as, for example, torque output, engine or motor speed, etc., and to then communicate that information to VCU 16. This information may be gathered from, for example, one or more of vehicle sensors 14 described below. Powertrain subsystem $12_1$ may also receive commands from VCU 16 to adjust certain operating parameters when, for example, a change in conditions dictates such a change (e.g., when a change in vehicle speed has been requested via a brake pedal (pedal 18 in FIG. 1) or accelerator pedal (pedal 20 in FIG. 1) of vehicle 10). While the description above has been with particular reference to powertrain subsystem $12_5$, it will be appreciated that the same principle applies to each such other subsystem 12 that is configured to exchange information/commands with VCU 16.

Each subsystem 12 may comprise a dedicated electronic control unit (ECU) that is configured to receive and execute instructions or commands provided by VCU 16, and/or to perform or control certain functionality independent from VCU 16. Alternatively, two or more subsystems 12 may share a single ECU, or one or more subsystems 12 may be directly controlled by the VCU 16 itself. In an embodiment wherein a subsystem 12 communicates with VCU 16 and/or other subsystems 12, such communication may be facilitated via any suitable connection, such as, for example, a controller area network (CAN) bus, a system management bus (SMBus), a proprietary communication link, or through some other arrangement known in the art.

It will be appreciated that the foregoing represents only some of the possibilities with respect to the particular subsystems of vehicle 10 that may be included, as well as the arrangement of those subsystems with VCU 16. Accordingly, it will be further appreciated that embodiments of vehicle 10 including other or additional subsystems and subsystem/VCU arrangements remain within the spirit and scope of the present invention.

Vehicle sensors 14 may comprise any number of different sensors, components, devices, modules, systems, etc. In one embodiment, some or all of sensors 14 may provide subsystems 12 and/or VCU 16 with information or input that can be used by the present method, and as such, may be electrically coupled (e.g., via wire(s) or wirelessly) to, and configured for communication with, VCU 16, one or more subsystems 12, or some other suitable device of vehicle 10. Sensors 14 may be configured to monitor, sense, detect, measure, or otherwise determine a variety of parameters relating to vehicle 10 and the operation and configuration thereof, and may include, for example and without limitation, any one or more of: wheel speed sensor(s); ambient temperature sensor(s); atmospheric pressure sensor(s); tyre pressure sensor(s); gyro sensor(s) to detect yaw, roll, and pitch of the vehicle; vehicle speed sensor(s); longitudinal acceleration sensor(s); engine torque sensor(s); driveline torque sensor(s); throttle valve sensor(s); steering angle sensor(s); steering wheel speed sensor(s); gradient sensor(s); lateral acceleration sensor(s) on, for example, the stability control system (SCS); brake pedal position sensor(s); brake pedal pressure sensor(s); accelerator pedal position sensor(s); air suspension sensor(s) (i.e., ride height sensors); wheel position sensor(s); wheel articulation sensor(s); vehicle body vibration sensor(s); water detection sensor(s) (for both proximity and depth of wading events); transfer case HI-LO ratio sensor(s); air intake path sensor(s); vehicle occupancy sensor(s); and longitudinal, lateral, and vertical motion sensor(s), among others known in the art.

The sensors identified above, as well as any other sensors that may provide information that can be used by the present method, may be embodied in hardware, software, firmware, or some combination thereof. Sensors 14 may directly sense or measure the conditions for which they are provided, or they may indirectly evaluate such conditions based on information provided by other sensors, components, devices, modules, systems, etc. Further, these sensors may be directly coupled to VCU 16 and/or to one or more of vehicle subsystems 12, indirectly coupled thereto via other electronic devices, vehicle communications bus, network, etc., or coupled in accordance with some ether arrangement known in the art. Some or all of these sensors may be integrated within one or more of the vehicle subsystems 12 identified above, may be standalone components, or may be provided in accordance with some other arrangement. Finally, it is possible for any of the various sensor readings used in the present method to be provided by some other component, module, device, subsystem, etc. of vehicle 10 instead of being directly provided by an actual sensor element. For example, VCU 16 may receive certain information from the ECU of a subsystem 12 rather than directly from a sensor 14. It should be appreciated that the foregoing scenarios represent only some of the possibilities, as vehicle 10 is not limited to any particular sensor(s) or sensor arrangements); rather any suitable embodiment may be used.

VCU 16 may comprise any suitable ECU, and may include any variety of electronic process devices, memory devices, input/output (I/O) devices, and/or other known components, and perform various control and/or communication related functions. In one embodiment, VCU 16 includes an electronic memory device 22 that may store various information, sensor readings (e.g., such as those generated by vehicle sensors 14), look-up tables or other data structures, algorithms (e.g., the algorithms embodied in the method described below), etc. In an embodiment, memory device 22 comprises a carrier medium carrying a computer-readable code for controlling the vehicle to carry out the method described below. Memory device 22 may also store pertinent characteristics and background information pertaining to vehicle 10 and subsystems 12. VCU 16 may also include an electronic processing device 24 (e.g., a microprocessor, a microcontroller, an application specific integrated circuit (ASIC), etc.) that executes instructions for software, firmware, programs, algorithms, scripts, applications, etc. that are stored in memory device 22 and may govern the methods described herein. As described above, VCU 16 may be electronically connected to ether vehicle devices, modules, subsystems, and components (e.g., sensors) via suitable vehicle communications and can interact with them when or as required, in addition to the functionality that may be performed by VCU 16 described elsewhere herein, in one embodiment, VCU 16 may also be responsible for various functions described above with respect to subsystems 12, especially when those subsystems are not also configured to do so. These are, of course, only some of the possible arrangements, functions, and capabilities of VCU 16, as other embodiments could also be used. Depending on the particular embodiment, VCU 16 may be a stand-alone vehicle electronic module, may be incorporated or included within another vehicle electronic module (e.g., in one or more of the subsystems 12 identified above), or may be otherwise arranged and configured in a manner known in the art. Accordingly, VCU 16 is not limited to any one particular embodiment or arrangement.

In addition to the components and systems described above, in one embodiment, vehicle 10 may further comprise one or more vehicle speed control systems. For example and with continued reference to FIG. 2, in one embodiment, vehicle 10 may further comprise a cruise control system 26, also referred to as an "on-highway" or "on-road" cruise control system, and a low-speed progress (LSP) control system 26, which may be referred to an "off-highway" or "off-road" progress control system.

On-highway cruise control system 26, which may comprise any number of conventional cruise control systems known in the art, is operable to automatically maintain vehicle speed at a desired "set-speed" set by the user. Such systems are generally limited in their use in that the vehicle must be travelling above a certain minimum threshold speed (e.g., 30 mph (approximately 50 kph)) for the system to be operable. As such, these systems are particularly suited for use in highway driving, or at least driving wherein there is not a lot of repealed starting and stopping, and that permits the vehicle to travel at a relatively high speed. As is known in the art, on-highway cruise control system 26 may include a dedicated or standalone ECU configured to execute and perform the functionality of the system, or alternatively, the functionality of cruise control system 28 may be integrated into another subsystem 12 of vehicle 10 (e.g., powertrain subsystem 12₁), or for example, VCU 16 (as is illustrated in FIG. 2).

Figure 3:
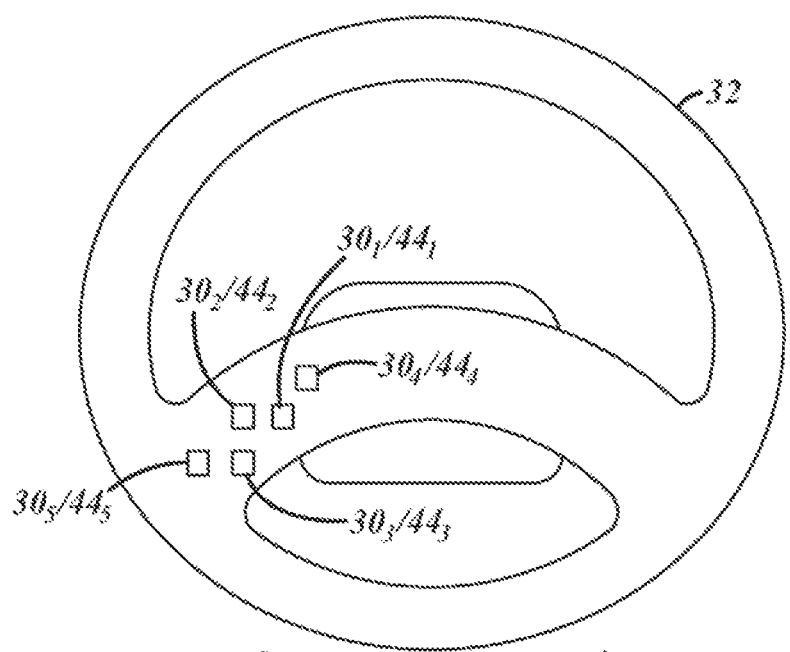
FIG. 3 is a diagram of a steering wheel for use with a vehicle, such as the vehicle illustrated in FIGS. 1 and 2.

Further, and as is known in the art, cruise control system 26 may include one or more user interface devices 30 that may be used by the user (e.g., driver) to interact with system 26 (e.g., the ECU thereof), and in certain embodiments, that allow the system to interact with the user. For example, these devices may allow a user to activate/deactivate system 26 and set and/or adjust the set-speed of the system, to cite a few possibilities. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, center console, etc.). For instance, and with reference FIG. 3, the steering wheel of vehicle 10 (i.e., steering wheel 32 in FIG. 1) may be configured with a plurality user interface devices of cruise control system 26 in the form of pushbuttons. One such device may be a "set speed" button $30_1$ that when manipulated in a particular manner may activate the operation of cruise control system 28 and also set the desired set-speed. Cruise control system 26 may further comprise one or more other user-selectable interface devices (e.g., buttons) to allow the user to increase or decrease the set-speed of the system. For example, a "+" button $30_2$ may be provided to allow the user to increase the set-speed in discrete increments (e.g., 1 mph (or 1 kph)), and a "−" button $30_3$ to allow the user to decrease the set-speed in the same or different discrete increments. Alternatively, the "+" and "−" buttons $30_2$, $30_3$ may be integrated info a single user-selectable device. Additional user-selectable interface devices of system 26 may include, for example, a "cancel" button $30_4$ to deactivate or suspend the system, as well as a "resume" button $30_5$ to allow for the system to be re-activated following a temporary suspension or deactivation of the system function.

It should be appreciated that the foregoing scenarios represent only some of the possibilities of cruise control system 28 and the user interface devices thereof, as vehicle 10 is not limited to any particular cruise control system or user interface device or arrangement; rather, any suitable embodiments may be used.

LSP control system 28 provides a speed control system that enables, for example, the user of a vehicle equipped with such a system to select a very low target speed or set-speed at which the vehicle can progress without any pedal inputs being required by the user. This low-speed progress control function differs from that of cruise control system 26 in that unlike cruise control system 26, the vehicle need not be travelling at relatively high speeds (e.g., 30 mph (approximately 50 kph)) for the system to be operable (although system 28 may be configured to facilitate automated speed control at speeds from rest to around 30 mph (approximately 50 kph) or more, and therefore, is not limited to "low speed" operation). Furthermore, known on-highway cruise control systems are configured so that in the event, the user depresses the brake or the clutch pedals, for example, the on-road cruise control function is cancelled and the vehicle reverts to a manual mode of operation requiring user pedal input to maintain vehicle speed. In addition, in at least certain cruise control systems, the detection of a wheel slip event, which may be initiated by a loss of traction, may also have the effect of cancelling the cruise control function. LSP control system 28 may also differ from such cruise control systems in that, in at least one embodiment, it is configured in such a way that the speed control function provided thereby is not cancelled or deactivated in response to those events described above. In an embodiment, LSP control system 28 is particularly suited for use in off-road of off-highway driving.

In one embodiment, LSP control system 28 includes, among potentially other components, an ECU 42 (shown, in the illustrated embodiment and for reasons described below, as comprising VCU 16) and one or more user input devices 44. ECU 42 may include any variety of electronic processing devices, memory or storage devices, input/output (I/O) devices, and any other known components, and may perform any number of functions of LSP control system 28, including those described below and embodied in the present method. To that end, ECU 42 may be configured to receive information from a variety of sources (e.g., vehicle sensors 14, vehicle subsystems 12, user input devices 44) and to evaluate, analyze, and/or process that information in an effort to control or monitor one or more operational aspects of vehicle 10. Further, in one embodiment, ECU 42 is configured to carry out or perform one or more steps of the present method described in greater detail below. It should be appreciated that ECU 42 may be a standalone electronic module or may be integrated or incorporated into either another subsystem 12 of vehicle 10 or, for example, VCU 16. For purposes of illustration and clarity, the description below will be with respect to an embodiment wherein the functionality of ECU 42 is integrated or incorporated into VCU 16, such that as illustrated in FIG. 2, VCU 16 comprises the ECU of LSP control system 28. Accordingly, in such an embodiment, VCU 16, and a memory device thereof or accessible thereby (e.g., memory device 22), in particular, stores various information, data (e.g., predefined set-speeds), sensor readings, look-up tables or other data structures, algorithms, software, and the like, required for performing the functionality of LSP control system 28, including that embodied in the method described below.

As with on-highway cruise control system 26 described above, LSP control system 28 further comprises one or more user interface devices 44 that may be used by a user to interact with the system 28, and in certain embodiments, to allow the system 23 to interact with the user. These devices may allow the user to, for example, activate/deactivate LSP control system 28, set and/or adjust the set-speed of the system, select a desired set-speed from a plurality of pre-defined set-speeds, switch between two or more predefined set-speeds, and otherwise interact with system 28 as may be described below. These user interface devices may also allow for system 28 to provide certain notifications, alerts, messages, requests, etc. to the user. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, etc.). In one embodiment, user interface devices 30, 44 of on-highway cruise control system 26 and LSP control system 28, respectively, are arranged adjacent to one another within vehicle 10, and, in one embodiment, on steering wheel 32 of vehicle 10. However, in other embodiments, such as, for example, that described herein, on-highway cruise control system 26 and LSP control system 28 may share some or all of the same user interface devices. In such an embodiment an additional user-selectable device, such as a switch, pushbutton, or any other suitable device may be provided to switch between the two speed control systems. Accordingly, in the embodiment illustrated in FIG. 3, those user interface devices $30_1$-$30_5$ described above with respect to cruise control system 26 may also be used in the operation of LSP control system 28, and as such, may also be referred to as user interface devices $44_1$-$44_5$ when discussed in the context of system 28.

For purposes of illustration and in addition to the functionality of LSP control system 28 described below, a description of the general operation of one embodiment of LSP control system 28 will now be provided. First, VCU 16, which in the embodiment described herein comprises the ECU of LSP control system 28, determines the desired speed at which the vehicle is to travel (referred to herein as "the desired set-speed"). This may be a set-speed selected by the user via user interface devices 44, or alternatively, VCU 16 may be configured to automatically determine or select a desired set-speed based on certain conditions or factors and without any user involvement. In either instance, in response to the selection of the desired set-speed, VCU 16 is configured to cause the vehicle to operate in accordance with the desired set-speed by effecting the application of selective powertrain, traction control, and/or braking actions to the wheels of the vehicle, collectively, or individually, to either achieve or maintain the vehicle at the desired set-speed. In one embodiment, this may comprise VCU 16 generating and sending appropriate commands to the appropriate subsystems 12 (such as powertrain subsystem 12$_1$ and brake subsystem 12$_3$), for example, and/or directly controlling the operation of one or more components, modules, subsystems, etc. of vehicle 10.

Figure 4:
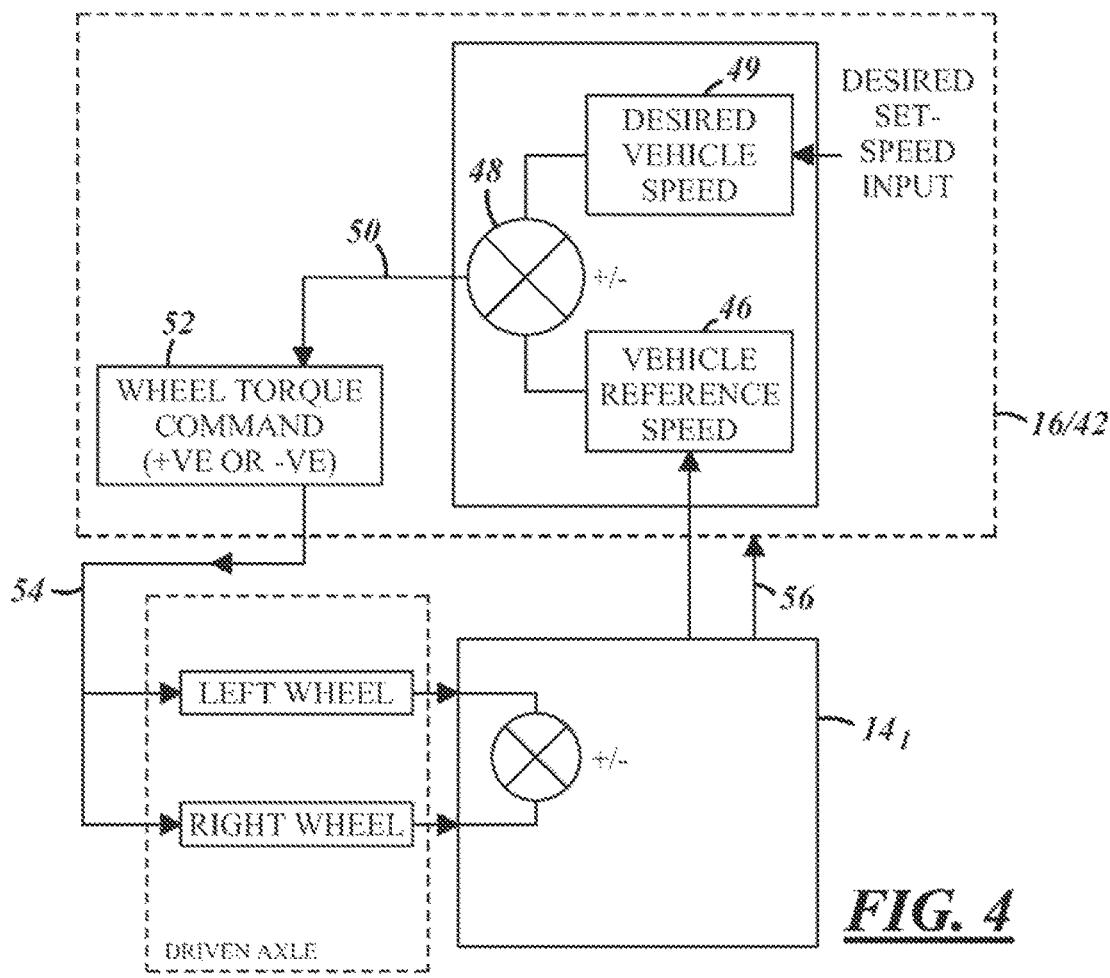
FIG. 4 is a schematic and block diagram illustrating the operation of an example of a speed control system of a vehicle, such as the vehicle illustrated in FIGS. 1 and 2.

More particularly, and with reference to FIG. 4, once the desired set-speed is determined, a vehicle speed sensor (identified as sensor 14$_1$ in FIG. 4) associated with the vehicle chassis or driveline provides a signal 46 indicative of vehicle speed to VCU 16. In one embodiment, VCU 16 includes a comparator 48 which compares the desired set-speed (represented with reference numeral 49 in FIG. 4) with the measured speed 46, and provides an output signal 50 indicative of the comparison. The output signal 50 is provided to an evaluator unit 52, which interprets the output signal 50 as either a demand for additional torque to be applied to the vehicle wheels by, for example, powertrain subsystem 12$_1$, or for a reduction in torque to be applied to the vehicle wheels, by, for example, brake subsystem 12$_3$, depending on whether the vehicle speed needs to be increased or decreased to maintain or achieve the desired set-speed. An output 54 from the evaluator unit 52 is then provided to one or more subsystems 12 so as to manage the torque applied to the wheels, depending on whether there is a positive or negative demand for torque from the evaluator unit 52. In order to initiate the necessary positive or negative torque being applied to the wheels, the evaluator unit 52 may either command that additional power is applied to the vehicle wheels or that a braking force is applied to the vehicle wheels, either or both of which may be used to implement the change in torque that is necessary to achieve or maintain the desired vehicle set-speed. Synchronized application of positive and negative torque to the wheels control the net torque applied thereto and is commanded by the LSP control system 28 to maintain vehicle stability and composure and regulate torque applied across each axle, in particular in the event of a slip event occurring at one or more wheels. In certain instances, VCU 16 may also receive a signal 56 indicative of a wheel slip event having occurred. In such embodiments, during a wheel slip event, VCU 16 continues to compare the measured vehicle speed with the desired set-speed, and continues to control automatically the torque applied across the vehicle wheels so as to maintain vehicle speed at the desired set-speed and manage the slip event.

In addition to the functionality described above, in one embodiment, LSP control system 28 may be further configured to detect, sense, derive, or otherwise determine information or condition relating, to the terrain over which vehicle 10 is travelling (e.g., surface type, terrain classification, terrain or surface roughness, etc.). In accordance with one embodiment, VCU 16 may be configured to perform this function and to do so in a number of ways. One such way is that described in UK Published Application No. GB2492748A published on 16 Jan. 2013, the entire contents of which are incorporated herein by reference. More particularly. In one embodiment, information relating to a variety of different parameters associated with the vehicle are received or acquired from a plurality of vehicle sensors and/or various vehicle subsystems, including, for example, some or all of those sensors 14 and/or subsystems 12 described above. The received information is then evaluated and used to determine one or more terrain indicators, which may represent the type of terrain and, in certain instances, one or more characteristics thereof, such as, for example, the classification, roughness, etc. of the terrain.

More specifically, in one embodiment, the speed control system (e.g., VCU 16) may include an evaluation means in the form of an estimator module to which the information acquired or received from one or more sensors 14 and/or subsystems 12 (collectively referred to as "sensor/subsystem outputs" below) is provided. Within a first stage of the estimator module, various ones of the sensor/subsystem outputs are used to derive a number of terrain indicators. In the first stage, vehicle speed is derived from wheel speed sensors, wheel acceleration is derived from wheel speed sensors, the longitudinal force on the wheels is derived from a vehicle longitudinal acceleration sensor, and the torque at which wheel slip occurs (if wheel slip occurs) is derived from a powertrain torque signal provided by the powertrain subsystem and additionally or alternatively from a torque signal provided by the driveline subsystem (e.g., transmission), and from motion sensors to defect yaw, pitch and roll. Other calculations performed within the first stage of the estimator module include the wheel inertia torque (the torque associated with accelerating or decelerating the rotating wheels), "continuity of progress" (the assessment of whether the vehicle is repeatedly starting and stopping, for example as may be the case when the vehicle is travelling over rocky terrain), aerodynamic drag, and lateral vehicle acceleration.

The estimator module also includes a second stage in which the following terrain indicators are calculated; surface rolling resistance (based on the wheel inertia torque, the longitudinal force on the vehicle, aerodynamic drag, and the longitudinal force on the wheels), the steering force on the steering wheel (based on the lateral acceleration and the output from a steering wheel sensor and/or steering column sensor), the wheel longitudinal slip (based on the longitudinal force on the wheels, the wheel acceleration, stability control system (SCS) activity and a signal indicative of whether wheel slip has occurred), lateral friction (calculated from the measured lateral acceleration and the yaw versus the predicted lateral acceleration and yaw), and corrugation detection (high frequency, low amplitude vertical wheel excitement indicative of a washboard type surface). The SCS activity signal is derived from several outputs from the ECU of a stability control system (SCS), which contains a dynamic stability control (DSC) function, a terrain control (TC) function, anti-lock braking system (ABS) and hill descent control (HDC) algorithms, indicating DSC activity, TC activity, ABS activity, brake interventions on individual wheels, and powertrain torque reduction requests from the SCS ECU to the powertrain subsystem. All these indicate a slip event has occurred and the SCS ECU has taken action to control it. The estimator module also uses the outputs from wheel speed sensors and in a four wheel vehicle, compares outputs across each axle and from front to rear on each side, to determine a wheel speed variation and corrugation detection signal.

In one embodiment, and in addition to the estimator module, a road roughness module may also be included for calculating the terrain roughness based on air suspension sensors (the ride height or suspension articulation sensors) and wheel accelerometers. In such an embodiment, a terrain indicator signal in the form of a roughness output signal is output from the road roughness module.

The estimates for the wheel longitudinal slip and the lateral friction estimation can be compared with one another within the estimator module as a plausibility check. Calculations for wheel speed variation and corrugation output, the surface rolling resistance estimation, the wheel longitudinal-slip and the corrugation detection, together with the friction plausibility check, are then output from the estimator module and provide terrain indicator output signals, indicative of the nature of the terrain over which the vehicle is travelling, for further processing by VCU 16. For example, the terrain indicators may be used to determine which of a plurality of vehicle subsystem control modes (e.g., terrain modes) is most appropriate based on the indicators of the type of terrain over which the vehicle is travelling, and to then automatically control the appropriate subsystems 12 accordingly.

In another embodiment, rather than LSP control system 28 performing the above-described terrain sensing/detecting functionality, another component, module, or subsystem of vehicle 10, such as, for example VCU 16 (in the case where it does not perform the functionality of LSP control system 28), chassis management subsystem 12$_2$, or another suitable component may be appropriately configured to do so, and such other embodiments remain within the spirit and scope of the present invention.

It should be appreciated that the foregoing description of the arrangement, functionality, and capability of LSP control system 28 has been provided for purposes of example and illustration only and is not meant to be limiting in nature. Accordingly, LSP control system 28 is not intended to be limited to any one particular embodiment or arrangement.

Again, the preceding description of vehicle 10 and the illustrations in FIGS. 1 and 2 are only intended to illustrate one potential vehicle arrangement and to do so in a general way. Any number of other vehicle arrangements and architectures, including those that differ significantly from the one shown in FIGS. 1 and 2, may be used instead.

Figure 5:
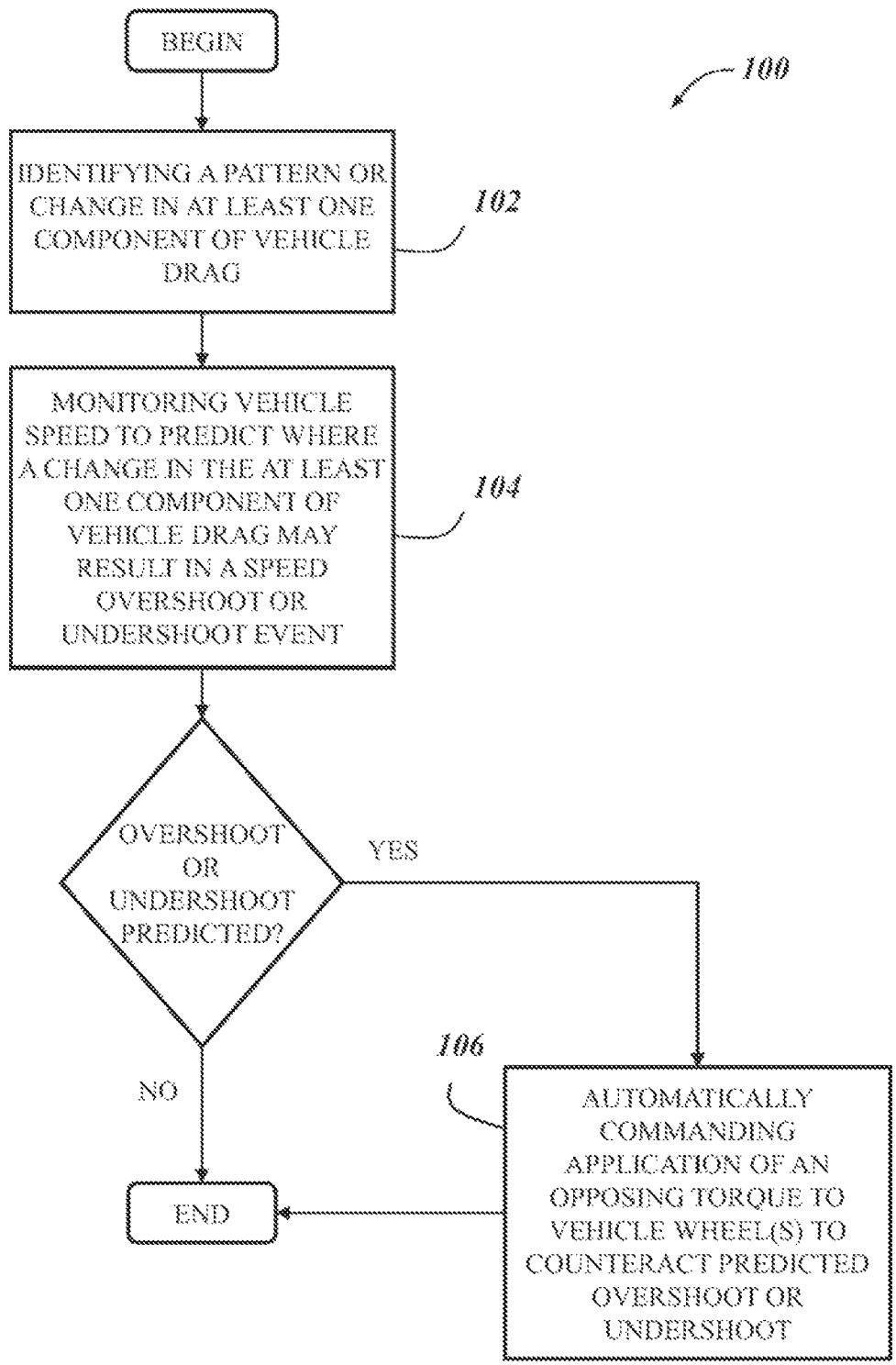
FIG. 5 is a flow diagram of a method for operating an off-road speed control system of a vehicle, such as the vehicle illustrated in FIGS. 1 and 2.

Turning now to FIG. 5, there is shown an example of a method 100 of operating an off-road speed control system of a vehicle. For purposes of illustration and clarity, method 100 will be described in the context of vehicle 10 illustrated in FIGS. 1 and 2 and described above. More specifically, method 100 will be described in the context of the low-speed progress (LSP) control system 28 of vehicle 10, which, for purposes of illustration, is integrated in VCU 16 (i.e., VCU 16 comprises ECU 42 of LSP control system 28). It will be appreciated however, that the application of the present methodology is not meant to be limited solely to such an arrangement, but rather method 100 may find application with any number of other speed control system arrangements, including, for example, LSP control systems other than that described above (e.g., not integrated into the VCU of a vehicle, and/or the VCU does not comprise the ECU of the speed control system), as well as, in certain instances, conventional "on-highway" cruise control systems, such as, for example, cruise control system 26 described above. Accordingly, the present invention is not meant to be limited to any one particular arrangement or type of speed control system. Additionally, it will be appreciated that the performance of method 100 is not meant to be limited to any one particular order or sequence of steps.

In an embodiment, the methodology of method 100 is provided to, for example, prevent, or at least substantially limit, the speed of a vehicle exceeding a speed control system target set-speed as the vehicle traverses environments in which the vehicle may experience varying degrees of drag. More particularly, method 100 may be used to control the speed of a vehicle as the vehicle transitions between environments requiring different or varying amounts of drive torque in order to, for example, substantially maintain the target set-speed, or at least minimize the amount by which the vehicle speed exceeds the set-speed due to powertrain or engine overrun, and thus, the adverse effects it has on vehicle composure and/or occupant comfort. For instance, in an embodiment, method 100 may be used to maintain the speed of a vehicle at a target set-speed as the vehicle transitions from a high-drag terrain or environment (e.g., sand, mud, gravel, etc.) to a low-drag terrain or environment (e.g., pavement, or other hard-packed surface). For purposes of this invention, maintaining the speed of the vehicle at a target set-speed of the speed control system includes maintaining the vehicle speed exactly at the target set-speed, as well as within a predetermined acceptable amount above or below the target set-speed, such as, for example and without limitation, within 10% above the target set-speed and within 20% below the target set-speed. It will be appreciated that while particular percentage values above and below the target set-speed have been provided, the present invention is not meant to be limited to such values; rather, any number of other percentages may be used instead depending on the particular implementation.

In an embodiment, method 100 comprises a step 102 of identifying a pattern or change (i.e., an increase or decrease) in at least one component of the drag experienced by the vehicle as the vehicle progresses in a direction of travel. More particularly, in an embodiment, step 102 comprises identifying that one or more wheels of the vehicle are experiencing a change in drag, i.e., an increased or reduced drag. In an embodiment, the identification made in this step may be based in whole or in part on one or more types of vehicle-related data. Accordingly, in such an embodiment, method 100 further includes a step (not shown) of receiving one or more electrical signals representative of vehicle-related information. The electrical signals may originate from any number of sources, including, but not limited to, one or more of vehicle sensors 14, one or more of vehicle subsystems 12, one or more memory devices (e.g., memory device 22 of VCU 16), or any other suitable or appropriate device or component of vehicle 10. Further, the electrical signals may represent a variety of information related to the vehicle, and the operation thereof, in particular, that may be used for the purposes described below.

One type of vehicle-related information is that relating to one or more operating parameters of the vehicle (also referred to herein as "vehicle parameter" or "vehicle parameters)". This may include, for example and without limitation, information related to: longitudinal vehicle acceleration; vehicle speed; wheel speed; vehicle attitude (e.g., pitch, roll, yaw, etc. of the vehicle body, changes in vehicle attitude, etch wheel articulation; applied drive torque; applied retarding torque; requested, actual, and rates of changes to drive and/or retarding torque; wheel slip; ride height; tyre pressure; tyre drag; tyre friction; steering wheel angle; lateral vehicle acceleration; terrain response (TR) mode; rolling resistance; gear selection; vehicle suspension articulation (e.g., extension or compression); and/or other parameters influencing vehicle body movement, to cite a few possibilities. The information relating to these parameters that is represented by the received electrical signals may include, for example, particular values or magnitudes of the operating parameters or other useful information. Electrical signals representative of one or more operating parameters of vehicle 10 may be received from one or more vehicle sensors 14 and/or one or more vehicle subsystems 12, including, but not limited to, those described elsewhere herein or from any other suitable component or device of vehicle 10.

Another type of vehicle-related information may be the type of terrain over which the vehicle is travelling (e.g., snow, water, sand, gravel, boulders, mud, grass, etc.), and/or one or more characteristics of that terrain (e.g., roughness, steepness, deformability, etc.). In an embodiment, this information may be received from a subsystem 12 of vehicle 10 that is configured to determine such terrain-related information. For example, the appropriate vehicle subsystem 12 may be queried and the appropriate terrain information (e.g., type classification, characteristic(s), etc.) may be received therefrom. In another embodiment, this information may already be stored in a memory device of, or accessible by, the component or device configured to perform at least certain steps of method 100, and thus, the information may be received from that memory device. For example, in an instance wherein VCU 16 is configured to perform at least certain steps of method 100, the information may be stored in memory device 22 of VCU 16, and thus, processing device 24 of VCU 16 may receive the information from memory device 22.

Another type of information may be that needed to determine, detect, or sense the type and/or one or more characteristics of the terrain the vehicle is traversing. For example, in an embodiment such as that described above wherein electrical signals representative of one or more operating parameters of vehicle 10 are received, these electrical signals may represent information relating to operating parameters of the vehicle that may be used to determine various types of terrain-related information. These operating parameters may include, for example, those described above with respect to the illustrative processes for determining terrain type/classification and/or characteristics thereof, or other relevant parameters. The received information may be evaluated and used in the manner described above for example, to determine the desired terrain-related information. For instance, in an embodiment wherein VCU 16 is configured to perform at least certain steps of method 100, VCU 16 may receive electrical signals representative of information relating to a variety of operational or operating parameters of the vehicle 10 from one or more vehicle sensors 14 and/or one or more subsystems 12. VCU 16 may then evaluate and use the received information in, for example, the manner described above to determine the desired terrain-related information.

While only certain types of information have been explicitly described above, it will be appreciated that the present invention is not meant to be limited to only those types of information. Rather, information in addition to of instead of that described above may also be acquired or received and used in the same manner as that described in greater detail below. Accordingly, the present invention is not limited to any one or more particular type(s) of information. Additionally, in an embodiment wherein VCU 16 is configured to perform some or ail of the steps of method 100, VCU 16 is configured to receive the electrical signals representative, of vehicle-related information. In other embodiments, however, components of vehicle 10 in addition to, or instead of, VCU 16 may be configured to receive the electrical signals.

By using the received vehicle-related information, a pattern or change in at least one component of the drag experienced by the vehicle as the vehicle progresses in a direction of travel may be identified. This may be done in a variety of ways.

For example, in an embodiment, a pattern or change in vehicle drag may be identified by monitoring one or more operating parameters of the vehicle that is/are represented by the received electrical signals, and then determining whether there is a pattern or has been a change in the vehicle drag based at least in part on the monitored operating parameters. More particularly, one or more monitored operating parameters may be, for example, compared to one or more corresponding threshold values or ranges, and depending on whether the monitored operating parameter meets, exceeds, or falls below the given threshold or range, a pattern or change in the vehicle drag may be identified. In an embodiment, these operating parameters may include those related to the attitude of the vehicle (e.g., pitch, yaw, roll, etc.) or change in the attitude of the vehicle, vehicle suspension articulation (i.e., extension or compression), wheel slip, wheel articulation, vehicle acceleration, vehicle speed, wheel speed, wheel torque at each wheel, brake force at each wheel, rolling resistance, and/or any other suitable parameter.

In one particular embodiment, the monitored operating parameter is the longitudinal acceleration of vehicle 10. In this embodiment step 102 comprises monitoring the longitudinal acceleration of vehicle 10 and then determining whether there is a pattern or has been a change in the vehicle drag based at least in part thereon. More particularly, in an embodiment, the longitudinal acceleration of the vehicle and the applied drive torque at one or more wheels of the vehicle may be monitored in view of prescribed acceleration profile. Both the longitudinal acceleration and the applied drive torque may be monitored using information or readings received or acquired from one or more vehicle sensors 14 (e.g., wheel speed sensors, longitudinal acceleration sensors, vehicle speed sensors, etc., in the case of the longitudinal acceleration; and torque sensors, in the case of the torque), one or more vehicle subsystems 12 (e.g., powertrain subsystem 12₁), and/or any other suitable component of vehicle 10. If, at a given applied drive torque, the longitudinal acceleration tracks, or is in-line with the acceleration profile, such that the vehicle speed will be maintained at the desired or target set-speed, it can be determined that there has not been a change in the vehicle drag, or at least net a significant change. Conversely, however, if the longitudinal acceleration of the vehicle exceeds or falls below that which is expected from the profile (or at least exceeds/falls below the profile by more than a predefined acceptable amount or for a more than predetermined amount of time), then it may be determined that there has been a change in the vehicle drag.

In another embodiment, the monitored operating parameter is the rolling resistance relating to one or more wheels of the vehicle, such as, for example, the leading wheels of the vehicle, which, when the vehicle is travelling forwards are the front wheels of the vehicle, and when the vehicle is travelling backwards are the rear wheels of the vehicle. In this embodiment, step 102 comprises monitoring the rolling resistance of one or more of the wheels and then identifying a pattern or change in the vehicle drag based at least in part thereon. More particularly, the rolling resistance of one or more wheels of the vehicle may be monitored using the information or readings received or acquired from one or more vehicle sensors 14 (e.g., wheel speed sensors, vehicle speed sensors, etc.), one or more vehicle subsystems 12 (e.g., powertrain subsystem 12₁), and/or any other suitable component of vehicle 10. If the rolling resistance increases, or at least does so by at least a particular amount (e.g. exceeds a certain predetermined threshold), it can be determined that the there has been a change in the vehicle drag.

Accordingly, in an embodiment one or more operating or vehicle parameters may be monitored and evaluated using techniques known in the art to determine whether there is a pattern or change in the vehicle drag.

In another embodiment, a pattern or change in the vehicle drag may be identified by monitoring information relating to the terrain the vehicle is traversing using the aforementioned received electrical signals, and then determining or identifying whether there is a pattern or has been a change in the vehicle drag based at least in part on the monitored terrain-related information. More particularly, in an embodiment, step 102 may comprise sensing or determining a change in the terrain the vehicle is traversing, and in response thereto, identifying a change in the vehicle drag. In such an embodiment, a terrain-related change may be sensed using, for example, the received electrical signals, and in certain instances, the electrical signals in conjunction with the techniques described above for determining terrain classification/type and/or characteristics thereof.

For example, if the received information comprises either an identification of a particular terrain type/classification or information relating to operating or vehicle parameters corresponding to, for example, the leading wheels of the vehicle that may be used to derive a type/classification of the terrain, a determination can be made that the vehicle is transitioning from one type of terrain (e.g., sand) to another (e.g., flat rock). Using a look-up table or other data structure stored in a memory device (e.g., memory device 22 of VCU 16) that correlates terrain type/classification and set-speed with drive torque, the drive torque required to propel the vehicle at the desired or target set-speed over the new terrain can be determined, and then based on this determination, a further determination can be made as to whether the currently applied drive torque exceeds that which is required to maintain the set-speed of the vehicle over the new terrain. If the current applied drive torque exceeds (or fails below) the required drive torque for the new terrain, or at least exceeds (or falls below) it by a predetermined amount, it may be determined that there has been or will be a change in vehicle drag.

In other embodiments, in addition to, or instead of, basing the determination on the change in the classification or type of terrain, the determination may be based on, for example, a change in a particular characteristic of the terrain (e.g., grade, surface roughness, deformability, etc.). For example, if the received information comprises either an identification of a characteristic of the terrain or information relating to operating parameters corresponding to, for example, the leading wheels of the vehicle that may be used to derive a characteristic of the terrain, a determination can be made that the vehicle is transitioning from a terrain having one characteristic (e.g., an incline) to the same terrain having a different characteristic (e.g., a decline, flat area, etc). Using a look-up fable or other data structure stored in a memory device (e.g., memory device 22 of VCU 16) that correlates terrain characteristics and set-speed with drive torque, the drive torque required to propel the vehicle at the desired or target set-speed over the new terrain can be determined, and then based on this determination, a further determination can be made as to whether the currently applied drive torque exceeds that required to maintain the set-speed of the vehicle over the new terrain characteristic, if the current applied drive torque exceeds (or falls below) the required drive torque for the new terrain, or at least exceeds (or falls below) it by a predetermined amount, if may be determined that there has been or will be a change in vehicle drag. Accordingly, it will be appreciated that various types of terrain-related information may be used to perform step 102, including, but not limited to, that described above.

In an embodiment wherein terrain-related information is utilized in step 102 in the manner described immediately above, step 102 may comprise: monitoring, using the one or more electrical signals representative of vehicle-related information, one or more operating parameters of the vehicle and/or information relating to the terrain the vehicle is traversing; sensing a change in the terrain the vehicle is traversing based at least in part on the monitored operating parameters and/or information relating to the terrain the vehicle is traversing; and identifying a pattern or change in vehicle drag based at feast in part on the sensed terrain change.

Skilled artisans will be appreciate that while certain examples of techniques for performing step 102 have been specifically identified above, techniques other than those described above may also be utilized. These techniques may involve the use of various types of vehicle-related information in addition to, or instead of, that described above, such as, for example, information relating to various additional or alternative operating parameters of the vehicle (e.g., parameters relating to, for example, vehicle ride height, gear ratio of the vehicle driveline (e.g., PTU or transmission), wheel slip or spin, tyre pressure, the particular mode in which the vehicle is operating (e.g., terrain mode), etc.), may be evaluated and used in the performance of step 102. Accordingly, the present invention is not intended to be limited to the use of any particular information. In an embodiment, the functionality of step 102 may be performed by VCU 16, and, for example, as part of the operation of a PID controller embodied in software therein, in particular, while in other embodiments, it may be performed by another suitable component of vehicle 10. Accordingly, the present invention is not limited to the performance of step 102 by any one particular component or device of vehicle 10.

As shown in FIG. 5, method 100 further comprises a step 104 of monitoring the speed of the vehicle to predict where the change in at least one component of vehicle drag, identified in step 102, may result in a speed or torque overshoot or a speed or torque undershoot. In accordance with at least one embodiment of the invention, a predicted overshoot event is considered to be a predicted temporary over-supply of torque from the powertrain subsystem of the vehicle, while a predicted undershoot is considered to be a predicted temporary under-supply of torque from the powertrain subsystem. In an embodiment step 104 comprises monitoring the actual speed of the vehicle, while in another embodiment, step 104 may comprise monitoring the speed of one or more wheels of the vehicle. In the latter instance the speed control system may be configured to determine an average wheel speed taken over a predetermined period of time or in accordance with another parameter, such as, for example, a particular number of wheel revolutions. While a number of operating parameters that may be used to derive and/or monitor vehicle speed may be used, for purposes of illustration only, the description below will be limited to an embodiment wherein the actual vehicle speed is monitored. In such an embodiment, the vehicle speed may be monitored in view of the particular target set-speed at which method 100 is attempting to maintain the speed of the vehicle, and then a determination or prediction can be made as to whether the change in vehicle drag may result in a speed or torque overshoot or undershoot based on how the monitored vehicle speed compares with the set-speed. More particularly, the speed of the vehicle may be monitored using the information or readings received or acquired from one or more vehicle sensors 14 (e.g., wheel speed sensors, vehicle speed sensors, etc.), one or more vehicle subsystems 12 (e.g., powertrain subsystem 12$_1$), and/or any other suitable component of vehicle 10. If the speed of the vehicle matches the set-speed of the speed control system for is at least less within a predetermined tolerance), it can be determined that the vehicle is operating at or sufficiently close to the set-speed, and thus, it can be determined or predicted that neither a speed or torque overshoot nor a speed or torque undershoot event is likely to occur. Conversely, however, if the vehicle speed exceeds the set-speed (or does so by at least a certain amount and/or for at least a certain amount of time), then it may be predicted that a speed or torque overshoot event may result; alternatively, if the vehicle speed falls below the set-speed (or does so by at least a certain amount and/or for at least a certain amount of time), then it may be predicted that a speed or torque undershoot event may result.

In addition to the above, and for reasons that will be described below, in some embodiments step 104 may further comprise predicting a window of time of speed or torque overshoot or undershoot. This prediction may be based on, for example, vehicle speed and the wheelbase of the vehicle, among other parameters, and may be calculated or determined as will be described in greater detail below.

Skilled artisans will be appreciate that while a particular example of a technique for predicting whether a speed or torque overshoot event or speed or torque undershoot event may occur as a result of a change in vehicle drag has been provided, techniques other than that described above may also be utilized These techniques may involve the use of various types of vehicle-related information in addition to, or instead of, that described above, such as, for example, information relating to various additional or alternative operating parameters of the vehicle (e.g., vehicle acceleration, for example) may be evaluated and used in the performance of step 104. Accordingly, the present invention is not intended to be limited to the use of any particular information. In an embodiment, the functionality of step 104 may be performed by VCU 16, and, for example, as part of the operation of a PID controller embodied in software therein, in particular, while in other embodiments, it may be performed by another suitable component of vehicle 10 either alone or in conjunction with VCU 16. Accordingly, the present invention is net limited to the performance of step 104 by any one particular component or device of vehicle 10.

If it is predicted in step 104 that a speed or torque overshoot event, or a speed or torque undershoot event, may result from a change in at least one component of the drag experienced by the vehicle, then method 100 proceeds to step 106; otherwise, method 100 may end or alternatively may loop back to step 102 or step 104 and may be repeated in same manner as that described above.

In response to a prediction in step 104 that a speed or torque overshoot event or a speed or torque undershoot event may result from a change in at least one component of the vehicle drag, step 106 can comprise automatically commanding the application of an appropriate opposing torque to at least one or more of the wheels of the vehicle to counteract the predicted speed or torque overshoot or undershoot. The particular type of opposing torque commanded to be applied in step 106 will depend upon whether an overshoot or undershoot event is predicted in step 104.

In the instance where a predicted overshoot event is predicted, the opposing torque will comprise a restraining or retarding torque that is applied to, for example, one or mere wheels of the vehicle. The restraining torque is intended to counteract overrun of the powertrain due to, for example, a decrease in vehicle drag (e.g., as the result of a transition from a high-drag to a low-drag environment) and the attendant effect it may have on the speed of the vehicle; in other words, the restraining torque is operative to counteract the effect of an overrun condition in the powertrain subsystem of the vehicle from increasing the speed of the vehicle (e.g., to maintain the vehicle speed substantially at or below the target set-speed, for example). In an embodiment, the application of a restraining torque in step 106 is done in conjunction with a commanded reduction in the applied drive torque (e.g., an increase in the rate at which the applied drive torque is decreased or reduced), and thus, in at least certain instance, step 106 may comprise balancing the application of a restraining torque with the reduction in the applied drive torque. One reason that reducing the applied drive torque (or increasing the rate of drive torque decrease) may not in and of itself be enough to prevent, or at least substantially limit the exceeding of the target set-speed is that there is typically a lag in the response of an internal combustion engine to changes in speed-control signals. More particularly, due to the physical nature of the internal combustion engine, torque output tends to lag torque demand. For instance, when torque demand goes from high to low, the rotational momentum of the engine holds the torque output artificially high until the engine has time to slow down. Unless the engine is disconnected from the wheels by clutch or other similar means, the response lag of the engine may manifest itself as powertrain or engine overrun as the vehicle overcomes an obstacle. While the powertrain/engine of the vehicle is typically slow to respond, the application of a restraining torque is typically much more responsive, and therefore, may be used to counteract a powertrain overrun condition.

Step 106 may comprise commanding the application of a restraining torque from one or more of a number of sources. For example, in an embodiment, brake subsystem 12$_3$ of vehicle 10 may be commanded to apply a restraining torque to one or more wheels of vehicle 10, if appropriately configured, powertrain subsystem 12$_1$ may also or alternatively be commanded to apply a restraining torque indirectly to one or more wheels of vehicle 10. More particularly, in an embodiment wherein powertrain subsystem 12, includes one or more electric machines, for example, one or more electric machines operable as electrical generators, that are configured to apply restraining torque to a portion of the powertrain subsystem and/or one or more wheels of the vehicle so as to cause the vehicle to decelerate with or without the use of the brake subsystem, powertrain subsystem 12$_1$ may be commanded to apply the restraining torque. Additionally or alternatively, a change in powertrain gear ratio may be commanded by, for example, changing a selected gear of the driveline or transmission of the vehicle. In other embodiments, components other than the brake and powertrain subsystems of vehicle 10 may be utilized, including, for example and without limitation, a hill descent control (HDC) system of the vehicle, the driveline or transmission of the vehicle (e.g., a gear shift or change in gear ratio), etc. Further, in some embodiments, the vehicle may be configured such that braking commands from certain sources, e.g., HDC or a hill held assist (HHA) system, may override or otherwise take priority over off-road speed control commands. In some embodiments, such priority may be arranged to occur if the gradient on which the vehicle is travelling and ascending is greater than a predetermined value and/or the speed is below a predetermined threshold. Thus, in some embodiments a powertrain and/or brake subsystem of the vehicle may respond to HDC or HHA commands in preference to off-road speed control system commands. It will be appreciated that the present invention is not limited to any particular source of restraining torque, rather any number of source(s), either alone or in combination, may be utilized to apply, or cause to be applied, a restraining torque to one or more wheels of vehicle 10.

In the instance where a predicted undershoot event is predicted, the opposing torque will comprise a drive or powertrain torque that is applied to, for example, one or more wheels of the vehicle. The drive or powertrain torque is intended to counteract an increase in drag applied to or experienced by the vehicle caused by an increase in retarding forces acting on the vehicle (e.g., as a result of transitioning from a low-drag to a high-drag environment) and the attendant effect those forces may have on the speed of the vehicle; in other words, the drive or powertrain torque is operative to counteract the effect of an increase in drag from unacceptably decreasing the speed of the vehicle (e.g., to maintain the vehicle speed substantially at or below the target set-speed, for example). These retarding forces may be the result of, for example, the vehicle traversing a high-drag terrain having a relatively high rolling resistance, the vehicle ascending a gradient, and the like. Step 106 may comprise commanding the application of the drive or powertrain torque from the powertrain subsystem of the vehicle. Additionally or alternatively, an application of the drive toque may be achieved through a gear shift or change in gear ratio of the driveline or transmission of the vehicle, or through any other suitable technique or from any other suitable source.

While certain schemes for commanding and applying opposing torque—whether restraining torque or drive/powertrain torque—have been described with particularity above, if will be appreciated that any number of schemes may be implemented, including schemes other than those described above. Accordingly, the present invention is not meant to be limited to any particular opposing torque command and application scheme(s).

As part of step 106, a determination is made as to the magnitude of the opposing torque that is to be applied to counteract the predicted overshoot or undershoot event. In an embodiment, this determination comprises determining a net required opposing torque, corresponding to the amount of positive or negative excess torque in the powertrain, as a result of a reduced or increased drag, less a determined amount of opposing torque on the powertrain caused by retarding forces acting on the vehicle.

In one example, the amount of excess torque may be determined in the following manner. For a certain set-speed, the amount of torque required for that speed is known (e.g., for a terrain or an ideal surface), as is the actual torque being delivered and applied to the vehicle wheels. The amount of torque required for that speed can be obtained, for example, via a look-up table or other data structure stored in a memory device (e.g. memory device 22 of VCU 16) or using any other technique known in the art. When a change in at least one component of vehicle drag is predicted at step 104, for example, the excess torque is then the amount of actual torque being delivered and applied to the vehicle wheels minus the amount of torque required for that speed. In an embodiment, the amount of opposing torque on the powertrain caused by retarding forces acting on the vehicle may be determined in any number of ways known in the art. For example, in an embodiment, the determination may be made by monitoring one or more operating parameters of the vehicle (also referred to as vehicle parameters) that is/are represented by the received electrical signals described above, and then determining the amount of opposing torque based at least in part on the monitored parameters. In some embodiments, parameters such as, for example, the rolling resistance of one or more wheels of the vehicle, direct drag on the vehicle body, and/or gravitation drag may be monitored and used. The parameters of interest may be monitored using information or readings received or acquired from one or more vehicle sensors 14, one or more vehicle subsystems 12, and/or any other suitable component of vehicle 10, and then used to determine an amount of opposing torque on the powertrain.

The amount of opposing torque commanded to be applied may correspond to excess torque minus drag on the vehicle as a result of other influencing forces such as those described above. In some embodiments, the amount of opposing torque could be calculated and that calculated torque could be applied, or alternatively, the application of the torque could be controlled utilizing a closed loop control technique that uses any one of a number of signals such as vehicle speed, wheel speed, acceleration, or another signal, as is well known in the art.

In an embodiment, the functionality of step 106 may be performed by VCU 16, and, for example, as part of the operation of a PID controller embodied in software therein, in particular, while in other embodiments. It may be performed by another suitable component of vehicle 10 either alone or in combination with VCU 16. Accordingly, the present invention is not limited to the performance of step 106 by any one particular component or device of vehicle 10.

Once the application of the opposing torque has been commanded in step 106 and thereafter applied, and it has been determined that the overshoot or undershoot event predicted in step 104 has been counteracted by the application of the opposing torque, method 100 may comprise commanding the reduction of the opposing torque commanded to be applied in step 106 (e.g., to substantially zero) and the applied drive torque may settle at a value sufficient to maintain the speed of the vehicle at the target set-speed of the speed control system. Accordingly, in an embodiment wherein method 100 includes the steps (not shown) of receiving a user input representative of an off-road target set-speed and regulating the vehicle speed up to the user-selected set-speed, once the overshoot or undershoot event has been counteracted, method 100 may comprise commanding the reduction of the opposing torque to maintain the speed of the vehicle at the user-selected set-speed. In certain instances, one or more intermediate steps may also be performed. For example, in an instance wherein the user-selected set-speed constitutes an increase in a previous user-selected set-speed, method 100 may comprise accelerating the vehicle to the increased user-selected or user input set-speed and, in response to a predicted speed or torque overshoot event, temporarily holding (i.e., maintaining) the speed of the vehicle at the prevailing speed of the vehicle at the time the overshoot is predicted, or suspending vehicle acceleration altogether. Again, once the overshoot or undershoot event has been counteracted, method 100 may comprise commanding the reduction of the opposing torque to maintain the speed of the vehicle at the user-selected set-speed. In this way, the vehicle may accept an increase in set-speed when the off-road speed control system is active, but only attempt to achieve the set-speed where the terrain over which the vehicle is travelling or moving will permit vehicle acceleration within a defined corridor (i.e., within a prescribed range, optionally between around +/−(0.1 g to 0.2 g), and not be caused to overshoot due to a detected or identified change in drag.

It will be understood that by compensating for a momentary speed or torque overshoot or undershoot by application of an appropriate opposing torque, vehicle composure may be maintained and speed or torque overshoot or undershoot can be avoided or at least an amount of overshoot or undershoot reduced. It will also be appreciated that in some embodiments, an off-road speed control system may be arranged to determine when to apply an opposing torque in dependence on factors such as selected terrain response (TR) mode, road roughness, brake temperature, gradient, and a determination of whether a user has intervened manually in respect of progress control, for example by depressing an accelerator pedal, changing off-road speed control set-speed or TR mode. Other arrangements may also be useful.

In addition to the above, method 100 may also include a number of additional steps. For example, in one embodiment and as briefly described above with respect to step 104, method 100 may further include a step (not shown) of predicting when a change in the component of the drag described above with respect to step 102 occurring at one or more leading wheel(s) will subsequently occur at one or more following wheel(s) (this step may relate to, for example, the predicting of a torque overshoot window described elsewhere above). The prediction in this step may be made based on one or more of the following: a speed at which vehicle 10 is travelling (e.g., set-speed), an angle or direction in which the one or more leading wheel(s) is/are directed, an angle at which steering wheel 32 is turned or rotated, or a wheelbase distance measured between the leading wheel and the following wheel. Depending on the embodiment, the prediction may be based on a duration of time of vehicle travel, a distance traveled, or both.

In one embodiment, once the predicting step is performed, method 100 may further include automatically controlling the application of torque to the one or more following wheel(s), in an example, powertrain subsystem $12_1$ is controlled and commanded to make torque adjustments applied to the following wheel(s) at a time to coincide, with, or prior to, when the prediction of step 104 will occur at the following wheel(s) (e.g., within the torque or speed overshoot window predicted in step 104, for example). The adjustments to the applied torque may involve increasing or reducing torque to the following wheel(s), also called shifting torque, in different examples, torque may be shifted via one or more clutches of the vehicle, a differential arrangement of the vehicle, both, or another way. In other embodiments, the steps of predicting and automatically controlling could take on different forms than what is described here. In the embodiments with the steps of predicting and automatically controlling, as described here, may provide the advantage that an amount of slip or a change in the component of the drag of one or more following wheels may be reduced relative to one or more leading wheels by anticipating slip or a change in the component of the drag of the one or more following wheels when they encounter areas of a surface or terrain that are known to be of reduced surface coefficient of friction, based on previously detected slip events and change in the component of the drag in respect of the one or more leading wheels. It is to be understood that in some embodiments, a reliability of a prediction of drag variation may further be enhanced by monitoring by the speed control system of a path that respective leading and following wheels or tyres are taking when a change in drag is detected at a leading wheel. In this way, the controller may make an assumption that if a following tyre is following the path of a leading tyre, the reduction in drag experienced by the leading tyre will be seen by the following tyre at a time proportional to vehicle speed and wheelbase. This method may be employed to shift unwanted torque (that would otherwise cause an occupant to experience vehicle acceleration that may be perceived as vehicle lurch) to the tyre in the high drag area during the predicted window of torque overshoot, improving fuel economy and reducing brake wear. Shifting of unwanted torque may be accomplished by means of one or more clutches and/or by means of a differential arrangement (which may include one or more clutches), for example a front, centre and/or rear differential arrangement. Other arrangements are also useful.

In one embodiment, in addition to or as part of the prediction and automatically controlling steps, method 100 may include a step of detecting a drag event at one or more leading wheels and/or at one or more following wheels of vehicle 10. This step may involve monitoring some of the vehicle-related information described above, and using the monitored information in order to detect a drag event. And once drag is detected, torque may be adjusted as described immediately above. For example, if a reduced drag is detected at one or more of the leading wheels, torque applied to one or more following wheels may be increased as a response. In another example, if a reduced drag is detected at one or more of the following wheels, torque applied to the one or more following wheels is reduced as a response. In yet another example, if an increased drag is defected at one or more leading wheels or at one or more following wheels, torque applied to the one or more leading wheels or to the one or more following wheels is increased as a response.

Figure 6:
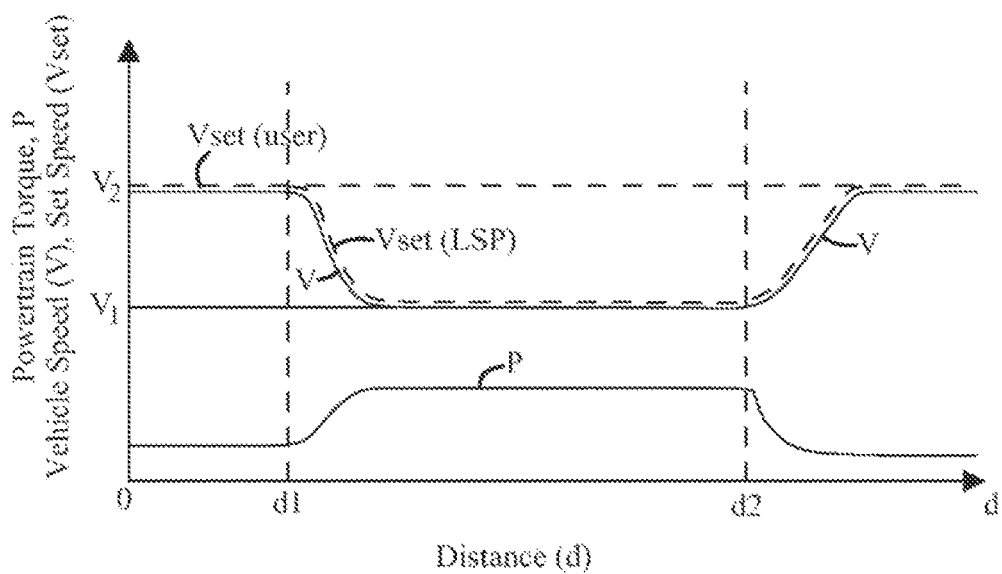
FIG. 6 is a plot of vehicle speed (V) and vehicle set-speed (Vset) as a function of distance (d) from a reference location for a vehicle, such as the vehicle illustrated in FIGS. 1 and 2, as it travels along a journey.

With reference to FIG. 6, and in order to provide a better understanding of various aspects and embodiments of the present invention described above, a non-limiting example or scenario of method 100 will now be described to illustrate the application of some or all of the above-described aspects. FIG. 6 is a plot of vehicle speed (V) and vehicle set speed (Vset) as a function of distance (d) from a reference location as vehicle 10, according to an embodiment of the present invention, traverses terrain. It is to be understood that between distances d1 and d2 from the reference location vehicle 10 encounters sandy terrain, whilst before and after the sandy terrain vehicle 10 experiences firm terrain having relatively low rolling resistance and a relatively high coefficient of surface friction.

The LSP control system 28 controls vehicle 10 to maintain a user-prescribed set speed Vset=V2 over the terrain. When the leading wheels of vehicle 10 first encounter the sandy terrain at distance d1, LSP control system 28 recognises that a speed V of vehicle 10 begins to reduce relatively abruptly as shown by trace V of FIG. 6. LSP control system 28 may also recognise that leading wheels of vehicle 10 are now experiencing relative high rolling resistance and relatively high drag forces. LSP control system 28 therefore determines that a reduced set speed Vset=v1 is more appropriate to travel over the sandy terrain in order to maintain vehicle composure, and reduces the set speed to this value. LSP control system 28 therefore controls vehicle 10 in a manner such as to reduce speed V to this value. Since additional rolling resistance is encountered, LSP control system 28 may command an increase the amount of torque P developed by powertrain subsystem $12_1$ as required (as shown in the lower trace P of FIG. 6) in order to maintain new set speed V1.

When the following wheels subsequently encounter the sandy terrain the amount of torque delivered to the following wheels is increased in a corresponding manner to compensate for the increased drag experienced by the following wheels.

As vehicle 10 continues through the sandy terrain, the leading wheels eventually encounter firmer terrain having reduced rolling resistance and a greater surface coefficient of friction, at distance d2. As the leading wheels contact this terrain, a rate of acceleration of vehicle 10 increases relatively abruptly as the wheels grip the new terrain. LSP control system 28 detects the increase in acceleration and may determine that a reduction in powertrain torque to the leading wheels is required in order to maintain vehicle composure. LSP control system 28 therefore commands a reduction in powertrain torque to the leading wheels via powertrain subsystem $12_1$.

In some embodiments, LSP control system 28 may also command application of a brake torque via brake subsystem $12_3$ to the leading wheels at this time, acting to resist wheel rotation against the positive torque applied by powertrain subsystem $12_1$ in order to prevent flare of the leading wheels and/or a likelihood that the set speed Vset is exceeded. This function has the advantage that a lag in powertrain response to the request for a powertrain torque reduction may be accommodated by LSP control system 28, enabling system 28 to control vehicle 10 with increased composure. In some embodiments LSP control system 28 controls vehicle 10 in such a manner as to reduce an amount of time for which a rate of acceleration exceeds the prescribed acceleration corridor.

In some embodiments LSP control system 28 may reduce the amount of powertrain torque provided to the following wheels via powertrain subsystem $12_1$ before the following wheels exit the sandy terrain in order to reduce a flare and/or a likelihood that the vehicle set speed Vset is exceeded when the following wheels also leave the sandy terrain. In some embodiments, brake subsystem $12_3$ may be applied to the following wheels in addition or instead. Brake subsystem $12_3$ may apply brake force to the following wheels once the leading wheels have encountered the new terrain, just before the following wheels encounter the new terrain, or as the following wheels encounter the new terrain. In this way, a brake force may be applied by the system to the following wheels pre-emptively, that is to say, before wheel spin or slip (flare) occurs, rather than reactively as with known vehicle stability systems optimized for en-road use. Other arrangements are also useful.

Once vehicle 10 exits the sandy terrain, LSP control system 28 determines that the set speed may now fee restored to a value Vset=v2. Accordingly, LSP control system 28 increases vehicle speed back to V=Vset=V2 after travelling distance d2.

In some embodiments, LSP control system 28 may be operable to predict when the following wheels will leave the sandy terrain (responsive to vehicle speed and/or distance traveled since the leading wheels encountered the new terrain, and vehicle wheelbase) and reduce an amount of torque applied to the following wheels at or just before the moment at which the following wheels leave the sandy terrain.

In an embodiment the speed control system may be operable to apportion more torque to one or more wheels on a harder, higher grip surface in order to manage slip and improve vehicle composure.

In another example of vehicle operation, the vehicle may move from a hard-packed surface to a soft surface and then back to a hard-packed surface as described above. As the vehicle moves onto the soft surface, the system may be arranged to apportion more torque to one or more following wheels so as to push the vehicle onto the soft surface. When subsequently exiting the soft surface the system may be operable to apportion greater torque to the leading wheels so as to pull the vehicle onto the hard packed surface. The system monitors a response of the vehicle body to one or more external forces and apportions torque between wheels so as to enhance vehicle composure.

In some embodiments, a speed control system may alternatively increase an amount of torque applied to one or more wheels experiencing relatively high drag in order to compensate for the relatively high drag as described above.

In some embodiments the speed control system may be operable to determine whether to increase torque to wheels experiencing higher drag (to compensate for the increased drag/rolling resistance or to wheels experiencing lower drag to push or pull the vehicle in dependence on a determination as to which option would deliver optimum vehicle composure. In some embodiments, if one method is selected and is found to be inadequate, the other method may be attempted. Other arrangements are also useful.

It is to be understood that a change in drag that may be addressed by the system by an increase in torque may be an appropriate indicator that a braking system should be pre-charged in order to allow the speed control system more quickly to compensate for an over-supply of torque if subsequently required, for example following for example cresling of an obstacle.

Some embodiments of the invention have the advantage that they may reduce greatly the effects of tyre erosion on off-road routes and improve tyre wear and fuel consumption. Embodiments of the invention may further improve vehicle composure by adapting to rapid or abrupt changes in drag or other forces acting on a vehicle caused by variation in terrain and resisting speed overshoot by a vehicle under the control of the off-road speed control system.

It will be understood that the embodiments described above are given by way of example only and are not intended to limit the invention, the scope of which is defined in the appended claims. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Further, the terms "electrically connected" or "electrically coupled" and the variations thereof are intended to encompass both wireless electrical connections and electrical connections made via one or mere wires, cables, or conductors (wired connections). Other terms are to be construed using their broadest reasonable meaning unless they are used in a context that requires a different interpretation.

The invention claimed is:

1. A method of operating an off-highway speed control system of a vehicle, the method comprising:
   identifying a terrain type;
   identifying a pattern or change in at least one component of vehicle drag based at least in part on the terrain type, wherein the identifying of the pattern or change in at least one component of vehicle drag based at least in part on the terrain type comprises determining that the vehicle is transitioning from one surface type having a first surface coefficient of friction and rolling resistance to a further surface type having a second surface coefficient of friction and rolling resistance;
   monitoring vehicle speed to predict where a change in said at least one component of vehicle drag as a result of the determined transition from the one surface type to the further surface type may result in a speed overshoot event or a speed undershoot event; and
   in response to said predicted speed overshoot event or speed undershoot event, automatically commanding an application of an appropriate opposing torque to one or more wheels of the vehicle to counteract said predicted speed overshoot event or undershoot event.

2. The method according to claim 1, wherein the predicted speed overshoot event is identified as a predicted temporary over-supply of torque from a powertrain subsystem of the vehicle.

3. The method according to claim 1, further comprising:
   identifying that at least one wheel of the vehicle is experiencing an increased drag;
   determining a magnitude of the opposing torque to apply to the at least one wheel of the vehicle; and
   commanding the application of said opposing torque at said determined magnitude.

4. The method according to claim 1, further comprising:
   identifying that at least one wheel of the vehicle is experiencing a reduced drag;
   determining a magnitude of the opposing torque to apply to the at least one wheel of the vehicle; and
   commanding the application of said opposing torque at said determined magnitude.

5. The method according to claim 1, further comprising monitoring one or more vehicle parameters and determining a magnitude of the opposing torque to apply to the one or more wheels of the vehicle, wherein determining the magnitude comprises determining a net required opposing torque corresponding to an amount of positive or negative excess torque in a powertrain as a result of a reduced or increased drag less a determined amount of opposing torque on the powertrain caused by retarding forces acting on the vehicle, said determined amount of opposing torque based at least in part on said one or more monitored vehicle parameters, and wherein said one or more monitored vehicle parameters include one or more of rolling resistance of at least one wheel of the vehicle, direct drag on a body of the vehicle, and gravitational drag.

6. The method according to claim 1, further comprising receiving a user input off-road set-speed and regulating the vehicle speed up to the user input off-road set-speed and, in response to an increase in the user input off-road set-speed, accelerating the vehicle to the increased user input off-road set-speed and, in response to a predicted speed overshoot event, temporarily maintaining a prevailing vehicle speed or suspending vehicle acceleration.

7. The method according to claim 1, further comprising:
   detecting drag at one or more leading wheels or one or more following wheels of the vehicle; and
   in response to predicting that a change in said detected drag will result in the speed overshoot event or the speed undershoot event, shifting torque from one or more wheels experiencing a lower drag to one or more wheels experiencing a higher drag;
   wherein the step of predicting where a change in said at least one component of vehicle drag may result in a speed overshoot event or a speed undershoot event further comprises predicting a window of time of torque overshoot, the method comprising shifting torque from the one or more wheels experiencing a lower drag to the one or more wheels experiencing a higher drag during the torque overshoot window.

8. The method according to claim 1 wherein identifying a change in vehicle drag comprises determining a required drive torque to maintain the vehicle at a current vehicle speed on the further surface type, and a current applied drive torque, and when the required drive torque and the currently applied drive torque differ by a predetermined amount, determining the change in vehicle drag.

9. An off-highway speed control system for a vehicle, comprising an electronic control unit (ECU), the ECU configured to:
   identify a terrain type;
   identify a pattern or change in at least one component of vehicle drag based at least in part on the terrain type, wherein the identifying of the pattern or change in at least one component of vehicle drag based at least in part on the terrain type comprises determining that the vehicle is transitioning from one surface type having a first surface coefficient of friction and rolling resistance to a further surface type having a second surface coefficient of friction and rolling resistance;
   monitor vehicle speed;
   predict where a change in said at least one component of vehicle drag may result in a speed overshoot event or a speed undershoot event as a result of the determined transition from the one surface type to the further surface type; and
   in response to said predicted speed overshoot event or speed undershoot event, automatically command an application of an appropriate opposing torque to one or more wheels of the vehicle to counteract said predicted speed overshoot event or undershoot event.

10. The system according to claim 9, wherein the predicted speed overshoot event is identified as a predicted temporary over-supply of torque from a powertrain subsystem of the vehicle.

11. The system according to claim 9, wherein the ECU is configured to:
   identify that at least one wheel of the vehicle is experiencing an increased drag;
   determine a magnitude of the opposing torque to apply to the at least one wheel of the vehicle; and
   command the application of said opposing torque at said determined magnitude.

12. The system according to claim 11, wherein the ECU is configured to: monitor one or more vehicle parameters; determine, based at least in part on said one or more monitored vehicle parameters, a determined amount of opposing torque on a powertrain caused by retarding forces acting on the vehicle; and determine the magnitude by determining a net required opposing torque corresponding to an amount of positive or negative excess torque in the powertrain as a result of a detected reduced or increased drag less the determined amount of opposing torque on the powertrain caused by retarding forces acting on the vehicle.

13. The system according to claim 12, wherein the ECU is configured to monitor one or more vehicle parameters and determine, based at least in part on said one or more monitored vehicle parameters, a determined amount of opposing torque on the powertrain caused by retarding forces acting on the vehicle.

14. The system according to claim 13, wherein the one or more monitored vehicle parameters include one or more of rolling resistance of at least one wheel of the vehicle, direct drag on a body of the vehicle, and gravitational drag.

15. The system according to claim 9, wherein the ECU is configured to:
    identify that at least one wheel of the vehicle is experiencing a reduced drag;
    determine a magnitude of the opposing torque to apply to the at least one wheel of the vehicle; and
    command the application of said opposing torque at said determined magnitude.

16. The system according to claim 9, wherein the ECU is configured to receive a user input off-road set-speed and automatically command the regulation the vehicle speed up to the user input off-road set-speed, and wherein the ECU is configured to, in response to an increase in the user input off-road set-speed, automatically command acceleration of the vehicle to the increased user input off-road set-speed and, in response to a predicted speed overshoot event, temporarily maintain a prevailing vehicle speed or suspend vehicle acceleration.

17. The system according to claim 9, wherein the ECU is configured to:
    detect drag at one or more leading wheels or one or more following wheels of the vehicle;
    in response to determining that a change in said detected drag will result in the speed overshoot event or the speed undershoot event, automatically command a shift of torque from one or more wheels at which a reduced drag is determined to one or more wheels experiencing a higher drag; and
    predict where a change in said at least one component of vehicle drag may result in a speed overshoot event or a speed undershoot event by predicting a window of time of torque overshoot, and automatically command a shift of torque from the one or more wheels experiencing a lower drag to the one or more wheels experiencing a higher drag during the torque overshoot window.

18. The system according to claim 17, wherein:
    when a reduced drag is detected at one or more of the leading wheels, the ECU is configured to automatically command an increase in torque to one or more of the following wheels in response thereto and to identify a subsequent reduction in the drag to one or more of the following wheels, and automatically command a reduction in the torque to the one or more of the following wheels in response thereto.

19. The system according to claim 17, wherein:
    when an increased drag is detected at one or more of the leading wheels, the ECU is configured to automatically command an increase in torque to one or more of the leading wheels in response thereto and to identify a subsequent increase in the drag to one or more of the following wheels, and automatically command an increase in torque to the one or more of the following wheels in response thereto.

20. The system according to claim 9 wherein the ECU is configured to identify a change in drag by determining a required drive torque to maintain the vehicle at a current vehicle speed on the further terrain type, and a current applied drive torque, and when the required drive torque and the currently applied drive torque differ by a predetermined amount, determine a change in vehicle drag.

21. A vehicle comprising an off-highway speed control system, wherein said speed control system comprises an electronic control unit (ECU), the ECU configured to:
    identify a terrain type;
    identify a pattern or change in at least one component of vehicle drag based at least in part on the terrain type, wherein the identifying of the pattern or change in at least one component of vehicle drag based at least in part on the terrain type comprises determining that the vehicle is transitioning from one surface type having a first surface coefficient of friction and rolling resistance to a further surface type having a second surface coefficient of friction and rolling resistance;
    monitor vehicle speed;
    predict where a change in said at least one component of vehicle drag may result in a speed overshoot event or a speed undershoot event as a result of the determined transition from the one surface type to the further surface type; and
    in response to said predicted speed overshoot event or speed undershoot event, automatically command an application of an appropriate opposing torque to one or more wheels of the vehicle to counteract said predicted speed overshoot event or undershoot event.

* * * * *